(12) United States Patent
Asada et al.

(10) Patent No.: US 8,676,401 B2
(45) Date of Patent: Mar. 18, 2014

(54) DOOR CONTROL AND CHARGE CONTROL FOR PLUG-IN CHARGE TYPE VEHICLE

(75) Inventors: Hiroshige Asada, Nagoya (JP); Takashi Kanamori, Nagoya (JP); Shinya Taguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 583 days.

(21) Appl. No.: 12/805,027

(22) Filed: Jul. 8, 2010

(65) Prior Publication Data
US 2011/0022256 A1   Jan. 27, 2011

(30) Foreign Application Priority Data

Jul. 24, 2009 (JP) .................................. 2009-173142
Jan. 7, 2010 (JP) ..................................... 2010-2191

(51) Int. Cl.
| G05D 1/00 | (2006.01) |
| G05D 3/00 | (2006.01) |
| G06F 7/00 | (2006.01) |
| G06F 17/00 | (2006.01) |

(52) U.S. Cl.
USPC .............................................. 701/2; 701/36

(58) Field of Classification Search
None
See application file for complete search history.

(56) References Cited

U.S. PATENT DOCUMENTS

| 5,008,603 | A | * | 4/1991 | Nakayama et al. ........ 318/568.1 |
| 5,521,443 | A | | 5/1996 | Imura et al. |
| 5,627,448 | A | * | 5/1997 | Okada et al. .................. 439/133 |
| 5,739,674 | A | | 4/1998 | Kawahara et al. |
| 6,433,512 | B1 | * | 8/2002 | Birkler et al. ................. 320/132 |
| 7,091,857 | B2 | * | 8/2006 | Lanigan et al. ............ 340/545.6 |
| 7,295,849 | B2 | * | 11/2007 | Ghabra et al. ................. 455/502 |
| 7,698,078 | B2 | * | 4/2010 | Kelty et al. ...................... 702/63 |
| 7,795,841 | B2 | * | 9/2010 | Matsumoto .................... 320/109 |
| 7,835,854 | B2 | * | 11/2010 | Yamamoto et al. ........... 701/117 |
| 8,311,690 | B2 | * | 11/2012 | Tanaka ............................ 701/22 |
| 2009/0021364 | A1 | * | 1/2009 | Frey et al. ..................... 340/468 |
| 2010/0210319 | A1 | | 8/2010 | Tanaka |
| 2011/0213520 | A1 | * | 9/2011 | Yaguchi et al. ................. 701/22 |

FOREIGN PATENT DOCUMENTS

| JP | A-2001-18749 | 1/2001 |
| JP | A-2003-219503 | 7/2003 |
| JP | A-2004-048900 | 2/2004 |
| JP | A-2004-082814 | 3/2004 |
| JP | A-2005-349947 | 12/2005 |
| JP | A-2006-74867 | 3/2006 |
| JP | A-2007-330083 | 12/2007 |
| JP | A-2008-247080 | 10/2008 |
| JP | A-2008-296669 | 12/2008 |
| JP | 2009-038872 A | 2/2009 |
| JP | A-2010-136494 | 6/2010 |

OTHER PUBLICATIONS

Asada et al., "Door Control and Charge Control for Plug-In Charge Type Vehicle", Jul. 8, 2010, Background of Invention—U.S. Appl. No. 12/805,027—(Applicant's Specification).*
Office Action mailed Oct. 11, 2011 in corresponding Japanese patent application No. 2010-002191 (with English translation).
Office Action mailed Jul. 3, 2012 in corresponding JP Application No. 2010-002191 (and English translation).
Search Report dated May 15, 2013 issued in the corresponding FR patent application No. 1055706 (and English translation).
Search Report dated May 3, 2013 issued in the corresponding FR divisional patent application No. 1057954 (and English translation).

* cited by examiner

Primary Examiner — Asfand Sheikh
(74) Attorney, Agent, or Firm — Posz Law Group, PLC

(57) ABSTRACT

In a vehicle door control system, when a mobile terminal accepts door lock manipulation and a vehicle door control apparatus receives a door lock signal from the mobile terminal, the vehicle door control apparatus determines that a door should be locked and, at time of door locking, transmits the amount of charge of a secondary battery at that time. Then the door is locked.

9 Claims, 15 Drawing Sheets

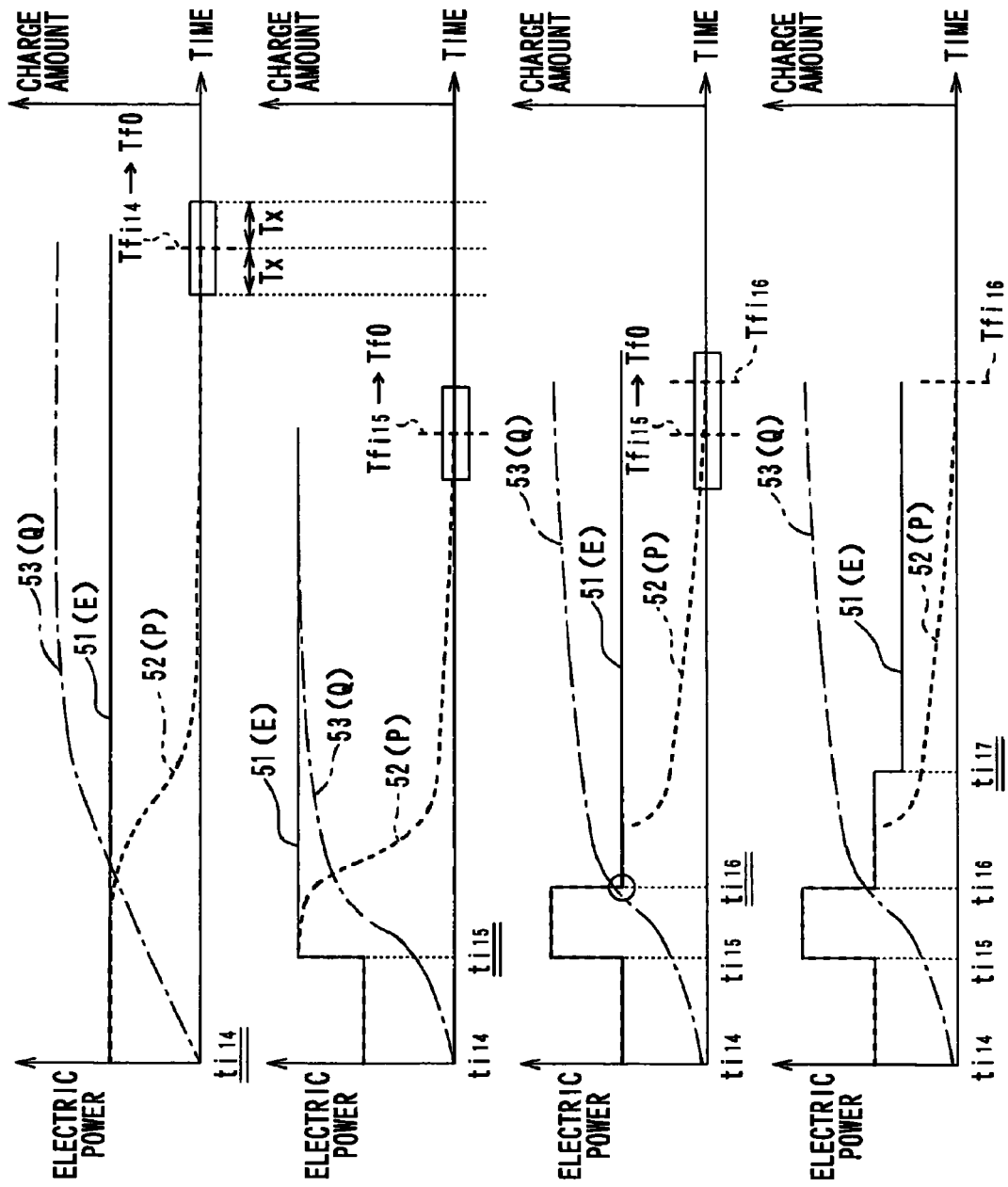

DOOR CONTROL AND CHARGE CONTROL FOR PLUG-IN CHARGE TYPE VEHICLE

CROSS REFERENCE TO RELATED APPLICATION

This application is based on and incorporates herein by reference Japanese patent applications No. 2009-173142 filed on Jul. 24, 2009 and No. 2010-2191 filed on Jan. 7, 2010.

FIELD OF THE INVENTION

The present invention relates to a door control and charge control for a plug-in charge type vehicle.

BACKGROUND OF THE INVENTION

As one of vehicles, which are driven by electric energy stored in a secondary battery, a vehicle (plug-in chargeable vehicle) is known as being capable of charging the secondary battery by using an electric power source provided outside the vehicle. As the plug-in charge type vehicles, for example, EV (electric vehicle) and PHV (plug-in hybrid vehicle) are known. Patent documents 1 and 2 disclose a technology of charging a secondary battery of a plug-in vehicle. According to this technology, in case of charging the secondary battery by an electric power source provided outside the vehicle, a radio signal indicating a charge amount of the secondary battery is transmitted from the vehicle to a mobile terminal and information about the charge amount is indicated on a display of the mobile terminal.
Patent document 1: JP 2008-247080A
Patent document 2: JP 2004-048900A This technology is proposed to be applied to a dedicated short range communications (for example, infrared communications, Bluetooth, weak radio communications in LF band and UHF band used in keyless entry systems). As a result of the study, the following problems are found.

In the short range communications, the mobile terminal will not be able to receive the radio signal indicating the charge amount if a user carrying the mobile terminal gets off and leaves the vehicle. It is therefore desired that the user carrying the mobile terminal can estimate the charge amount by way of the mobile terminal even after leaving far away from the vehicle. The mobile terminal is required to receive the signal indicating the charge amount from the vehicle at least once for estimating the charge amount. If the signal indicating the charge amount is persistently transmitted from the vehicle as long as the mobile terminal is present within a range, in which it is possible to communicate with the vehicle, however, the electric power consumed for such communications will increase.

Further it is likely in the plug-in charge type vehicle that an electric power supply cable for connecting the secondary battery and the outside power source is forgotten to be disconnected. The user of the vehicle should normally disconnect the power supply cable connecting the secondary battery and the outside power source, and then gets in and starts to drive the vehicle. However, the user often forgets it and starts to drive the vehicle. In case of the short range communications, it becomes possible again to establish communications between the mobile terminal and the vehicle when the user carrying the mobile terminal comes back from the remote place and gets in the vehicle. It is configured transmit a signal indicating a state of connection of the power supply cable, which is for connecting the secondary battery and the outside power source, from the vehicle to the mobile terminal when the communications is resumed, and provide notification of warning to the user by the mobile terminal when the signal indicates that the electric power supply cable is still being not disconnected. The notification is sometimes not effective in a period from resumption of communications between the mobile terminal and the vehicle to start of travel of the vehicle.

As a result of study about estimation of the charge amount of the vehicle by the mobile terminal, it is found that, since the charge amount is notified at time irrespective of state of charge of the vehicle according to the technology disclosed in the patent documents 1 and 2, the notification is sometimes inappropriate to estimate the charge amount by the mobile terminal. For example, the mobile terminal is likely to transmit frequently inquires to the vehicle even though it is readily possible to estimate the charge based on a persistent increase of the charge amount at a constant rate. Such communications is wasteful. Further, even if the power supply capacity of a charger, which supplies the vehicle with electric power, changes greatly, the charge amount is not notified in some cases. In this case, the charge amount estimated by the mobile terminal differs greatly from the actual charge amount.

SUMMARY OF THE INVENTION

It is a first object of the present invention, in a plug-in charge type vehicle, which travels by electric energy stored in a secondary battery and charges the secondary battery by an electric power source provided outside a vehicle, to suppress electric power consumed for transmission of a signal indicating a charge amount of the secondary battery from the vehicle to a mobile terminal and to ensure reception of the signal indicating the charge amount.

For attaining the first object, a signal indicating a charge amount of a secondary battery of a vehicle is transmitted from the vehicle to a mobile terminal carried by a user of the vehicle at time of locking a door of the vehicle, when a predetermined door lock signal is generated in response to door lock manipulation performed by the user of the vehicle.

It is a second object of the present invention, in a plug-in charge type vehicle, which includes a secondary battery for storing energy of travel and charges the secondary battery by an electric power source provided outside a vehicle, to control time of transmission of a signal indicating a state of connection of a power supply cable, which connects the secondary battery and the outside power source, from the vehicle to a mobile terminal.

For attaining the second object, a plug state signal, which indicates whether a secondary battery of a vehicle is connected or disconnected to an external power source through a cable, is transmitted to a mobile terminal carried by the user of the vehicle, when a predetermined door unlock signal is generated in response to door unlock manipulation performed by the user of the vehicle.

It is a third object of the present invention, in a charge state notification system, in which a charge monitor unit notifies a mobile terminal of a charge state (for example, charge amount) of a battery of a plug-in charge type vehicle and the mobile terminal estimates the charge amount based on the received charge state, to perform notification of the charge amount at time, which is appropriate for the mobile terminal to estimate the charge state.

For attaining the third object, it is checked whether notification of a charge state of a secondary battery of a vehicle to a mobile terminal is necessary based on a change in electric power available at a plug receptacle of an external power source or based on a change in the number of vehicles connected to a plurality of plug receptacles of the power source. When the notification of the charge state is determined to be necessary, a charge state of the secondary battery is transmitted from the vehicle to the mobile terminal and a present estimate charge amount of the secondary battery is estimated by the mobile terminal based on the charge state transmitted from the vehicle.

BRIEF DESCRIPTION OF THE DRAWINGS

The above and other objects, features and advantages of the present invention will become more apparent from the following detailed description made with reference to the accompanying drawings. In the drawings:

FIGS. 22A to 22D are schematic diagrams showing examples of checking by the third and the fourth check methods whether the charge state notification is necessary;

DETAILED DESCRIPTION OF THE PREFERRED EMBODIMENT (First Embodiment)

Figure 1:
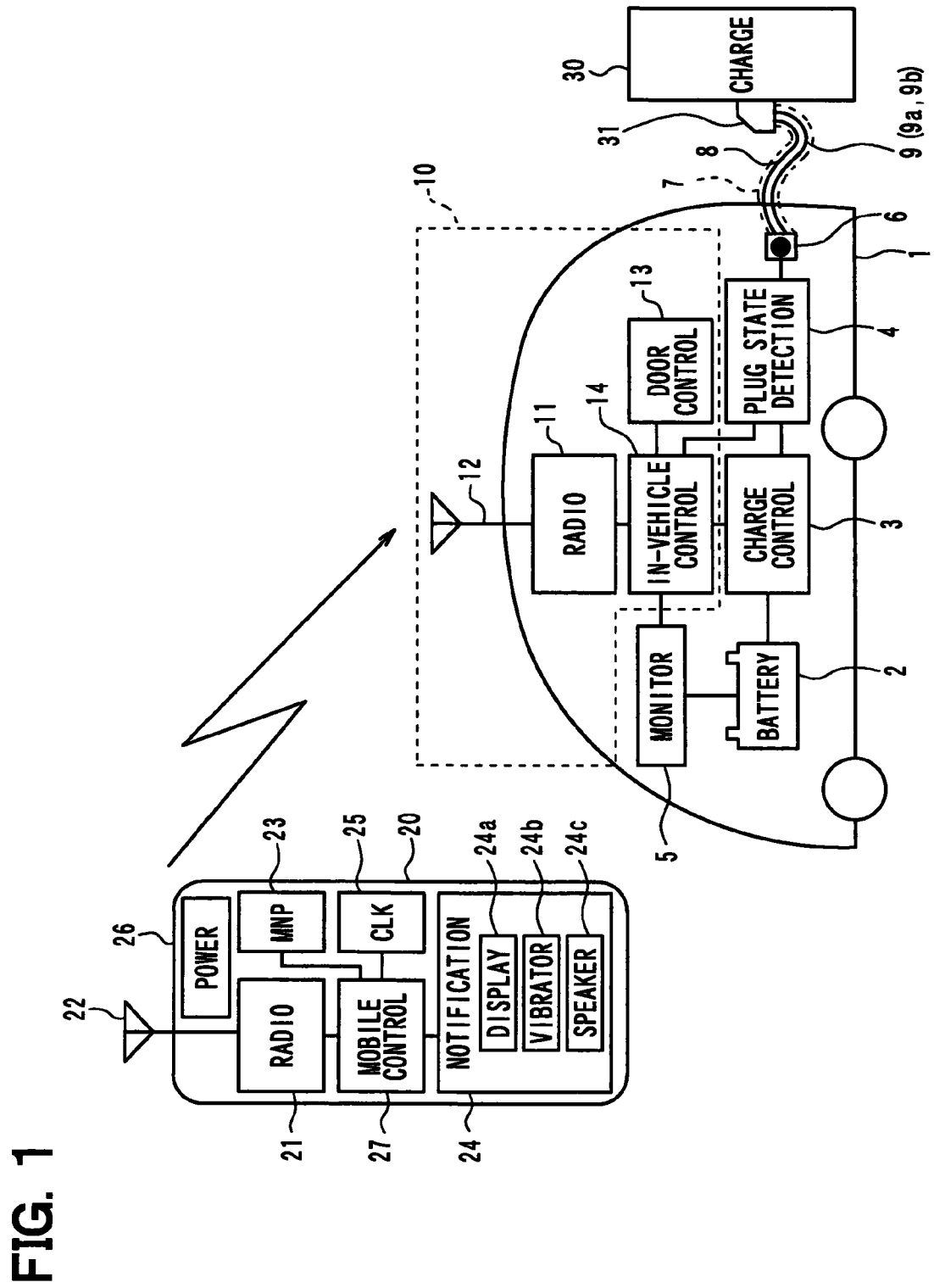
FIG. 1 is a schematic view of a vehicle door control system according to the first embodiment of the present invention.

A vehicle door control system according to the present invention will be described below with respect to the first embodiment shown in FIG. 1.

A vehicle 1 includes, as configuration parts of an in-vehicle system, a battery 2, a charge control unit 3, a plug state detection unit 4, a charge monitor 5, an electric connector 6, an electric cable 7 and an in-vehicle door control apparatus 10. The vehicle 1 is configured to be capable of receiving electric power from an external charge device 30 provided outside the vehicle 1. The charge device 30 is an electric power source provided at a parking lot of a private home, an apartment or the like.

The cable 7 is provided in the vehicle 1 and connected to the connector 6 of the vehicle 1 to connect the connector 6 to the charge device 30. This cable 7 is normally retracted within the vehicle 1 when it is not used, and pulled out when it is used. This cable 7 includes a power supply sire 8 and a connection detection line 9.

The power supply wire 8 is provided to transfer the electric power supplied from the charge device 30 to the connector 6 of the vehicle 1, under the condition that a plug of the cable 7 is plugged into a plug receptacle 31 of the charge device 30.

The connection detection wire 9 includes two conductive wires 9a and 9b for detecting the plug-in of the plug of the cable 7 into the plug receptacle 31. The two conductive wires 9a and 9b are connected to the connector 6 at when the plug of the cable are plugged into the charge device 30. The terminals of the charge device 30, to which the conductive wires 9a and 9b connect, are always held in the conductive state. When the plug of the cable 7 is not plugged into the plug receptacle 31, the conductive wires 9a and 9b are not in the conductive state. When the plug of the cable 7 is plugged into the plug receptacle 31, the conductive wires 9a and 9b are in the conductive state.

The connector 6 is an interface circuit, which electrically connects the end of the power supply wire 8 to the plug state detection unit 4 and electrically connects the ends of the conductive wires 9a and 9b of the connection detection wire 9 to the plug state detection unit 4.

The battery 2 is a secondary battery, which is repetitively chargeable. The vehicle 1 travels by using the electric power stored in the battery 2 as the travel energy. Specifically, an electric motor (not shown) is driven by the energy of the power of the battery 2 so that the vehicle 1 travels with this drive power of the motor. Electric vehicles (EV) and hybrid vehicles (HV) are known as vehicles, which travel with the electric power stored in the battery 2 as the energy source. In case of the electric vehicle, the vehicle travels with only the drive power of the motor driven by the electric power stored in the battery 2. In case of the hybrid vehicle, the vehicle travels with both drive power of the motor driven by the electric power stored in the battery and the drive power of an internal combustion engine.

The charge control unit 3 is configured to charge the battery 2 by optimally controlling the electric power received from the plug state detection unit 4 and supplying it to the battery 2. The supply of the power from the charge control unit 3 to the battery 2 is controllable by the vehicle door control apparatus 10.

The plug state detection unit 4 is configured to repeat checking whether the connector and the charge device 30 are connected through the power supply wire and output its check result to the in-vehicle control unit 14. Specifically, the plug state detection unit 4 checks in the conventional method whether the conductive wires 9a and 9b of the connection detection wire 9 are in the conductive state. If the conductive wires 9a and 9b are conductive, that is, the plug of the cable 7 is plugged into the plug receptacle 31, it is determined that the connector 6 and the charge device 30 are in the conductive state. If the conductive wires 9a and 9b are not conductive, that is, the plug of the cable 7 is not plugged into the plug receptacle 31, it is determined that the connector 6 and the charge device 30 are not in the conductive state.

The plug state detection unit 4 is configured to supply the received electric power to the charge control unit 3 as received, when the electric power is received from the external charge device 30 through the connector 6 and the power supply wire 8.

The charge monitor unit 5 is configured to detect voltage, temperature, state of charge (SOC), number of times of charging, number of discharging and the like repetitively (for example, at every 1 minute regularly) and output signals indicative of the detection results to the in-vehicle control unit 14. The charge monitor unit 5 is configured to output, in response to a request from the in-vehicle control unit 14, the signal indicating the SOC at the time of such a request to the in-vehicle control unit 14. It is noted that SOC is information, which indicates the amount of electric power stored in the battery 2 (or value of parameter corresponding to the electric power) and the amount of electric power chargeable until the battery 2 is fully charged (or value of parameter corresponding to the chargeable amount). In the following description, the amount of electric power stored in the battery 2 (or parameter value corresponding to the electric power amount) is referred to as the charge amount of the battery 2.

The vehicle 1 is thus configured to charge the battery 2 from the charge device 30 by way of the power supply wire 8, the connector 6, the plug state detection unit 4 and the charge control unit 3. The vehicle 1 is thus configured as a plug-in charge type vehicle, which is equipped with the battery for storing energy for travel and capable of charging the battery 2 by the external charge device 30 provided outside the vehicle.

The vehicle door control apparatus 10 is configured to lock and unlock a door (not shown) of the vehicle 1 by the short range radio communications with the mobile terminal 20. The short range radio communications is defined as communications of a limited range, which is about several tens of centimeters to several tens of meters. For example, it includes infrared data communications, Bluetooth and weak radio communications, which is in the LF band or the UHF band used in many conventional keyless entry systems.

This vehicle door control apparatus 10 includes an in-vehicle radio unit 11, an in-vehicle antenna 12, a door control unit 13 and an in-vehicle control unit 14.

The in-vehicle radio unit 11 is configured to perform signal processing such as baseband processing, frequency conversion, modulation, demodulation, amplification and the like for performing the short range radio communications with the mobile terminal 20. The in-vehicle radio unit 11 is controlled by the in-vehicle control unit 14. Specifically, the in-vehicle radio unit 11 is configured to perform amplification, frequency conversion, demodulation, baseband processing and the like on the radio signal received from the in-vehicle antenna 12 so that the radio signal may be converted into a signal, which can be processed by the in-vehicle control unit 14. This converted signal is output to the in-vehicle control unit 14. The in-vehicle radio unit 11 is also configured to perform the baseband processing, demodulation, frequency conversion, amplification and the like on the signal outputted from the in-vehicle radio unit 11. A resulting radio signal is transmitted externally from the vehicle through the in-vehicle antenna 12.

The door control unit 13 is configured to lock and unlock the door under control of the in-vehicle control unit 14. The lock and unlock of the door is realized by a lock mechanism (not shown) driven under control of the door control unit 13. In the lock mechanism, a lock member is moved from the unlock position to the lock position at time of door locking and from the lock position to the unlock position at time of door unlocking by an electromagnetic or mechanical device.

The door lock mechanism may include, for example, a striker fixed to the lower inside wall of the door, a latch engageable with the striker, a locking plate (lock member) engageable with the latch and an actuator for actuating the locking plate. In this exemplary door lock mechanism, the actuator moves the locking plate in the direction toward the lock position by rotating a DC motor in the case of door locking, thereby engaging the latch and the striker. In addition, the actuator moves the locking plate in the direction toward the unlock position by rotation the DC motor in the case of door unlocking, thereby disengaging the latch and the striker.

Thus the lock member is moved when the door is locked or unlocked. If a user (for example, a vehicle driver) is near the vehicle, the user will hear the sound generated by the movement of the lock member or see the movement of the lock member itself. The user will thus recognize that the door is locked or unlocked. The in-vehicle control unit 14 may be configured to notify the user of the door locking or the door unlocking by lighting headlights, hazard lights or the like (all not shown) of the vehicle 1 for a predetermined time period, when the door is locked or unlocked.

The in-vehicle control unit 14 may be a microcomputer, which includes a CPU, a RAM, a ROM, a flash memory and the like. The CPU executes a control program stored in the ROM. Specifically, in execution of such a program, the CPU retrieves data from the RAM, the ROM and the flash memory, stores data in the RAM and the flash memory, receives signal from the in-vehicle radio unit 11, the charge control unit 3, the plug state detection unit 4 and the charge monitor unit 5 and controls the in-vehicle radio unit 11, the door control unit 13 and the in-vehicle control unit 14. The operation of the in-vehicle control unit 14 will be described later in detail.

The mobile terminal 20 is carried by the user and configured to perform the short range radio communications with the apparatus 10. According to the present embodiment, the mobile terminal 20 is used as a radio (wireless) key of the keyless entry system. The mobile terminal 20 includes a mobile radio unit 21, a mobile antenna 22, a manipulation unit (one example of door manipulation unit) 23, a mobile notification unit 24, a power control unit 26 and a mobile control unit 27.

The mobile radio unit 21 is configured to perform signal processing such as baseband processing, frequency conversion, modulation, demodulation, amplification and the like for the short range communications. The mobile radio unit 21 is controlled by the mobile control unit 27. Specifically, the mobile radio unit 21 is configured to perform the amplification, frequency conversion, demodulation, baseband processing and the like on a radio signal received from the mobile antenna 22 so that the radio signal may be converted into a signal, which can be processed by the mobile control unit 27. This converted signal is output to the mobile control unit 27. The mobile radio unit 21 is also configured to perform baseband processing, demodulation, frequency conversion, amplification and the like on the signal outputted from the mobile control unit 27. A resulting radio signal is transmitted externally from the mobile terminal 20 through the mobile antenna 22.

As long as electric power is supplied to the mobile radio unit 21, the electric power is persistently consumed for the baseband processing, frequency conversion, modulation, demodulation and amplification. If no electric power is supplied to the mobile radio unit 21, no electric power is consumed for the baseband processing, frequency conversion, modulation, demodulation and amplification.

The manipulation unit 23 has manipulation members such as push buttons, which are directly manipulatable by the user. According to the present embodiment, the manipulation unit 23 has at least two push buttons. One of the two push buttons is a door lock button for instructing locking of the door of the vehicle 1. The other push button is a door unlock button for instructing unlocking of the door of the vehicle 1. Pressing the door lock button is an example of manipulation for locking the door. Pressing the door unlock button is an example of manipulation for unlocking the door. When the manipulation member is operated by the user, the manipulation unit 23 outputs a signal indicating the manipulation content to the mobile control unit 27.

The mobile notification unit 24 is configured as a device, which notifies the user of various items by characters, images, vibration, sound or the like under control of the mobile control unit 27. The mobile notification unit 24 includes a display unit 24a, a vibrator 24b and a speaker 24c. The display unit 24a is configured as a character/image display device such as a liquid crystal display, which provides the user with display of characters or images. The vibrator 24b is configured to vibrate itself and provide the user with vibration. The speaker 24c is configured to provide the user with sound.

The clock 25 is configured to measure the present day and time and output the measured result to the mobile control unit 27.

The mobile power control unit 26 is configured to supply the units 21 to 25 and 27 of the mobile terminal 20 with the operation voltage. The mobile power control unit 26 is configured to turn on and off supply of the electric power to the mobile radio unit 21 under control of the mobile control unit 27.

The mobile control unit 27 may be a microcomputer, which includes a CPU, a RAM, a ROM, a flash memory and the like. The CPU executes a control program stored in the ROM. Specifically, in execution of such a program, the CPU retrieves data from the RAM, the ROM and the flash memory, stores data in the RAM and the flash memory, receives signal from the mobile radio unit 21, the manipulation unit 23 and the clock 25, and controls the mobile radio unit 21, the mobile notification unit 24 and the power control unit 26. The operation of the mobile control unit 27 will be described later in detail.

The operation of the vehicle door control system according to the present embodiment will be described in detail below. According to the present embodiment, when the user gets off the vehicle 1 and locks the door by manipulating the mobile terminal 20, the in-vehicle door control apparatus 10 transmits a signal, which indicates the charge amount of the battery 2 and the like, to the mobile terminal 20. Then, when the user carrying the mobile terminal 20 leaves the vehicle 1, the mobile terminal 20 estimates by calculation the charge amount of the battery 2 of the present time based on the charge amount received at the time of door locking, elapse time and charge rate repetitively at every predetermined display time. The mobile terminal 20 displays a predicted travel distance, which the vehicle 1 can travel further, based on the estimate charge amount. Thus, the user can confirm the predicted travel distance of the vehicle 1 even at a location away from the vehicle 1.

When the user returns to the vehicle 1 and unlocks the door by manipulating the mobile terminal 20, the in-vehicle door control apparatus 10 detects whether the vehicle 1 and the charge device 30 are electrically connected via the power supply wire 8. The apparatus 10 transmits the plug state signal indicating the detection result to the mobile terminal 20. Immediately after receiving the plug state signal, the mobile terminal 20 checks whether the vehicle 1 and the charge device 30 are connected via the power supply wire 8 based on the received plug state signal. If the vehicle 1 is being connected to the charge device 30, the mobile terminal 20 activates the vibrator 24b and the speaker 24c to provide the user with the notification of alarm.

The operation of the vehicle door control system is described first with respect to a case, in which the user gets off the vehicle, locks the door and leaves the vehicle 1.

Figure 2:
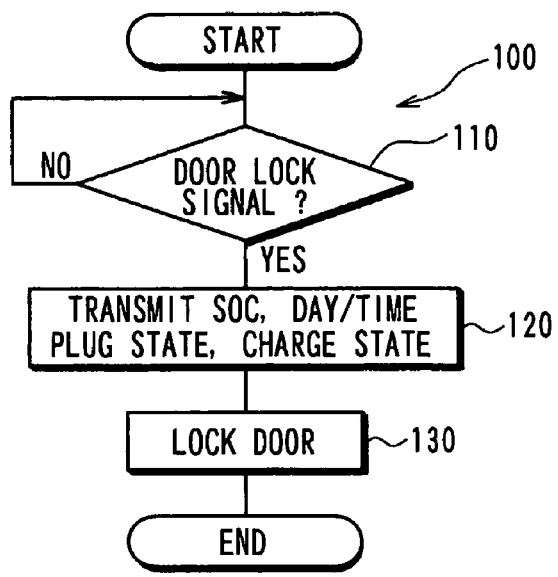
FIG. 2 is a flowchart showing a program, which is executed by an in-vehicle control unit immediately after a door is unlocked.

The in-vehicle control unit 14 executes, immediately after the door of the vehicle 1 is locked, a program 100 shown in a flowchart form in FIG. 2. As described later, this program 100 ends after the door is locked. Therefore, this program 100 is repetitively executed while the door is in the unlocked state. The in-vehicle control unit 14 executes normally in repetition a program 200 shown in a flowchart form in FIG. 3 for charging the battery 2. The mobile control unit 27 executes normally in repetition a program 300 shown in a flowchart form in FIG. 4 for accepting the door lock manipulation. The sequence of normal operation, which occurs between the user and the vehicle 1, is shown in FIG. 5.

Figure 5:
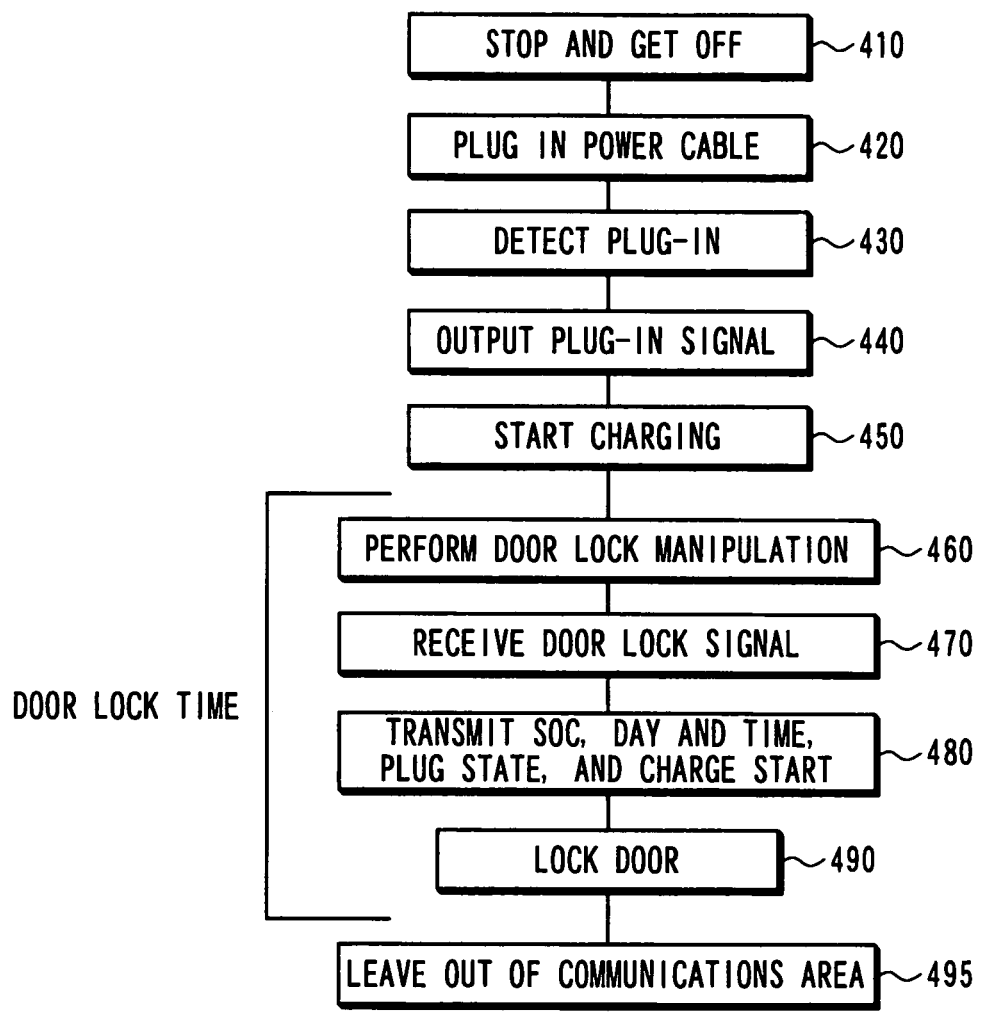
FIG. 5 is a sequence of operations, which normally occur between a user and the vehicle, when the user gets off the vehicle and leaves the vehicle.

In FIG. 5, it is assumed that the user carrying the mobile terminal 20 stops and gets off the vehicle 1 (stage 410). At this moment, the plug state detection unit 4 still outputs a detection result, which indicates that the connector 6 and the charge device 30 are not connected, to the in-vehicle control unit 14 of the apparatus 14. Then the user pulls out the cable 7 from the vehicle 1 and plugs it into the plug receptacle 31 of the charge device 30 (stage 420). Since the conductive wires 9a and 9b of the connection detection wire 9 are rendered conductive, the plug state detection unit 4 detects the plug-in state of the connector 6 to the charge device 30 through the power supply wire 8 (stage 430) and outputs the detection result (plug-in signal in FIG. 5) to the in-vehicle control unit 14 of the in-vehicle door control apparatus 10 (stage 440). Thus, charging of the battery 2 is started (stage 450) by the charge control unit 3. More specifically, the charging is started in response to the plug-in signal as shown in FIG. 3.

Figure 3:
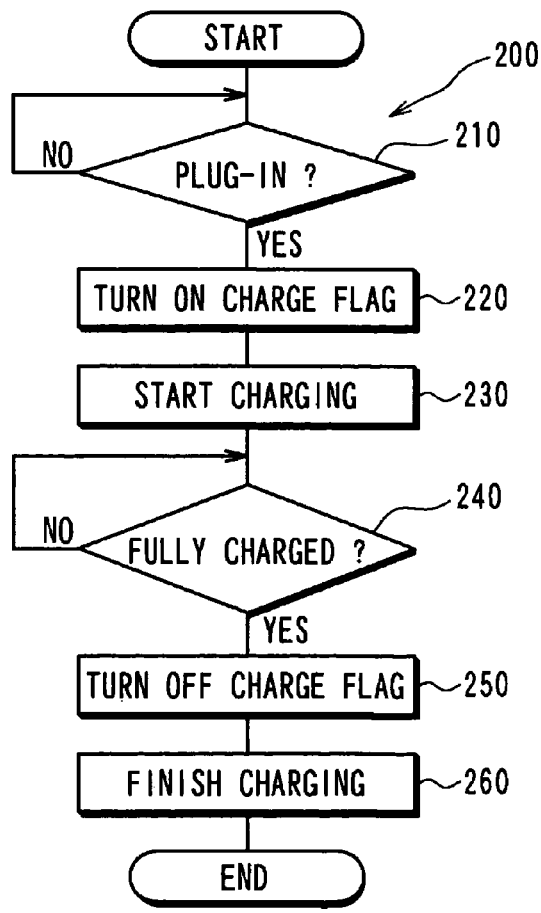
FIG. 3 is a flowchart showing a program, which is executed normally in repetition by the in-vehicle control unit for charging a battery.

The in-vehicle control unit 14 determines at step 210 in FIG. 3 that the connector 6 is connected to the charge device 30 through the cable 8 (that is, plugged in) based on a change of the plug-in signal outputted from the plug state detection unit 4 to indicate that the connector 6 and the charge device 30 are connected through the cable 8. The in-vehicle control unit 14 then executes step 220. The in-vehicle control unit 14 turns on the charge flag in the RAM or the flash memory at step 220. The in-vehicle control unit 14 controls the charge control unit 3 to start charging of the battery 2 by the charge device 30 at step 230. The charge control unit 3 may output a confirmation signal, which indicates that the charging has been started, to the in-vehicle control unit 14 after the charging is started. The charging of the battery 2 thus started is continued until it is determined at step 240 that the battery 2 has been fully charged.

It is assumed that the user then performs the door lock manipulation on the manipulation unit 23 of the mobile terminal 20 near the vehicle 1 to lock the door (stage 460) for leaving the vehicle 1. The mobile control unit 27 determines at step 305 in FIG. 4 that the door lock manipulation has been made, and executes step 310. At step 310, the mobile control unit 27 controls the power control unit 26 to turn on the supply of power to the mobile radio unit 21, which has been turned off. Thus, the short range communications by the mobile radio unit 21 is enabled.

The mobile control unit 27 controls the mobile radio unit 21 at step 315 to transmit to the in-vehicle door control apparatus 10 a door lock signal including predetermined contents and at step 320 waits and receives information such as SOC, which will be transmitted from the in-vehicle door control apparatus 10.

When the door lock signal transmitted from the mobile terminal 20 is received (stage 470), the in-vehicle control unit 14 determines at step 110 in FIG. 2 that the door lock signal has been received and executes step 120. At step 120, the in-vehicle control unit 14 controls the in-vehicle radio unit 11 to transmit signals of the present SOC of the battery 2, day and time, the plug state and the charge state to the mobile terminal 20 (stage 480).

The present SOC is acquired from the charge monitor unit 5 and the day and time are acquired from the clock 25. The plug state signal indicates the latent detection result outputted from the plug state detection unit 4. The plug state signal has ON level and OFF level, if the connector 6 and the charge device 30 are connected and not connected through the power supply wire 8, respectively. In this example, the plug state signal has the ON level, because the cable 7 is plugged into the plug receptacle 31. The charge state signal has the same value as the charge state flag. In this example, the charge state signal also has also ON level, because the charging has already been started.

At step 130, the in-vehicle control unit 14 controls the door control unit 13 to lock the door and ends the program 100. The door of the vehicle 1 is thus locked (stage 490) by the control of step 130.

The mobile terminal 20 transmits the door lock signal when the manipulation unit 23 is manipulated for door locking. Therefore, the determination of reception of the door lock signal at step 110 corresponds to the determination of reception of the door lock signal transmitted in response to the door lock manipulation. The door is locked at step 130 after the determination of reception of the door lock signal at step 110. Therefore, the determination of reception of the door lock signal at step 110 corresponds to the determination that door of the vehicle 1 should be locked.

The operation from the door lock manipulation on the manipulation unit 23 at stage 460 in FIG. 5 to the locking of the door at stage 490 occur almost at the same time. Therefore, the period from stage 460 to stage 490 and a short period (for example 1 second) immediately after stage 490 corresponds to the time, at which it is determined that the door of the vehicle 1 should be locked (door lock time).

Figure 4:
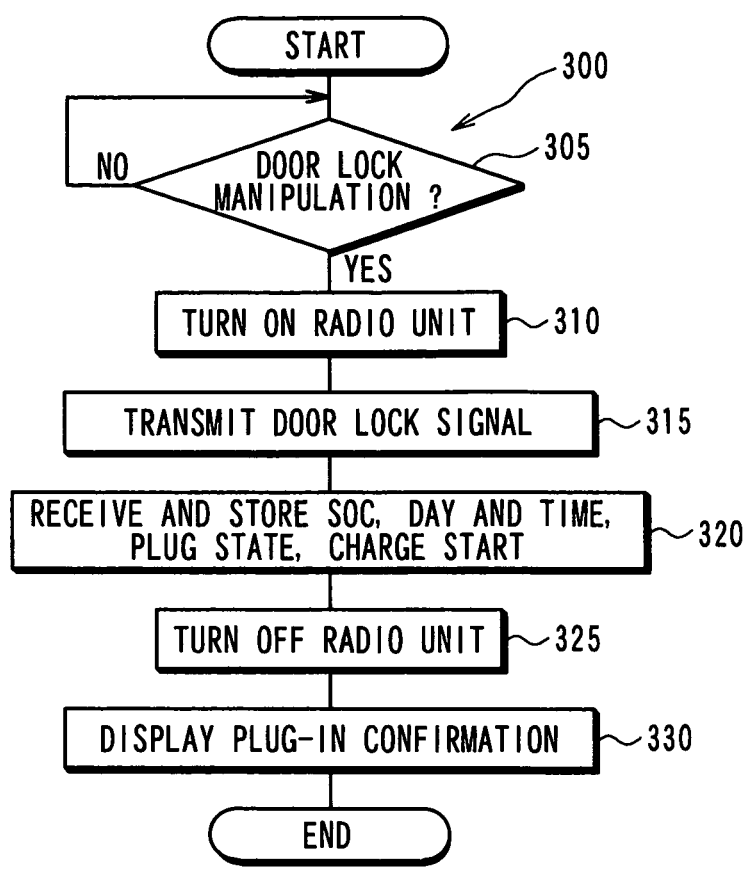
FIG. 4 is a flowchart showing a program which is executed normally in repetition by a mobile control unit to accept a door lock manipulation.

When the mobile radio unit 21 of the mobile terminal 20 receives the signals indicating the SOC, the present day and time, the plug state and the charge state transmitted at stage 480 are received, the mobile control unit 27 stores the information indicated by these signals in the RAM or the flash memory at step 320 in FIG. 4. The mobile control unit 27 then controls the power control unit 26 to turn off the power supply to the power control unit 26 at step 325.

The mobile control unit 27 provides display indicating confirmation of the plugged-in state at step 330. That is, if the plug state signal received immediately before indicates ON, the display unit 24a is driven to indicate that the charge device 30 is connected to the connector 6 through the power supply wire 8. For example, the display unit 24a displays characters of "PLUG-IN ON." If the plug state signal received immediately before indicates OFF, the display unit 24a is driven to indicate that the charge device 30 is not connected to the connector 6 through the power supply wire 8. For example, the display unit 24a displays characters of "PLUG-IN OFF." If the charge device 30 is connected to the connector 6 through the power supply wire 8, the charging of the battery 2 will soon be started. Therefore, this display indicating that the charge device 30 is connected to the connector 6 through the power supply wire 8 corresponds to the display indicating that the charging is being effected.

It is possible to provide the display of charge confirmation at step 330 in place of the display of plug-in confirmation. That is, if the charge state signal received immediately before indicates ON, the display unit 24a may be driven to indicate that charging of the battery 2 has been started. For example, "CHARGE ON" may be provided on the display unit 24a. If the charge state signal received immediately before indicates OFF, the display 24a may be driven to indicate that charging of the battery 2 has not yet been started. For example, "CHARGE OFF" may be provided on the display unit 24a. After step 330, step 305 is executed to wait until the door lock manipulation is performed.

After the door is locked at stage 490, the user leaves the vehicle 1. The mobile terminal 20 carried by the user thus moves out from the communications area in which the mobile terminal 20 can communicate with the in-vehicle door control apparatus 10 (stage 495).

According to the vehicle door control system configured as above, when the manipulation unit 23 of the mobile terminal 20 accepts the door lock manipulation and the in-vehicle radio unit 11 receives the door lock signal from the mobile terminal 20, the in-vehicle control unit 14 determines that the door of the vehicle 1 should be locked (step 110 in FIG. 2). At this time of the determination of door lock, the door is locked and the signals including the present SOC, day and time and the like are transmitted to the mobile terminal 20. More specifically, the signals indicating the SOC and day and time and the like at that time (door lock time) are transmitted to the mobile terminal 20 (step 120), and the door is locked immediately (step 130).

The door lock time is substantially the same as the time of start of charging, if it is compared with the time required to charge the battery 2 from the fully-discharged state to the fully-charged state. Therefore, at the time of door locking, the signals indicating the SOC, day and time and the like, which are present at the time of start of charging, are transmitted.

In a case that the door is locked in correspondence to the door lock manipulation on the manipulation unit 23 by the user, it is very likely that the signal indicating the SOC transmitted from the in-vehicle door control apparatus 10 is received by the mobile terminal 20. This is because that the door is locked in response to both of the door lock manipulation and the reception of the door lock signal by the in-vehicle radio unit 11. That is, the door locking in response to the door lock manipulation indicates that the predetermined door lock signal transmitted from the mobile terminal 20 has been received by the in-vehicle door control apparatus 10. The reception of the door lock signal by the in-vehicle door control apparatus 10 indicates that communications environment of the radio communications path between the mobile terminal 20 and the in-vehicle door control apparatus 10 is good. This means that it is highly possible that the signal indicating the SOC transmitted from the in-vehicle door control apparatus 10 is received by the mobile terminal 20 surely.

Therefore, if the user performs the door lock manipulation on the manipulation unit 23 and confirms that the door has been actually locked by hearing the door lock operation sound (lock member operation sound) of the vehicle 1 or viewing the door lock operation (movement of lock member), it is highly likely that the signal indicating the SOC has been received by the mobile terminal 20.

If the door is not actually locked in spite of the door lock manipulation on the manipulation unit 23 by the user, it indicates that the predetermined door lock signal transmitted from the mobile terminal 20 has not been received by the in-vehicle door control apparatus 10. This case indicates, however, that the communications environment of the radio communications path between the mobile terminal 20 and the in-vehicle door control apparatus 10 is not good. This means that it is highly possible that the signal indicating the SOC transmitted from the in-vehicle door control apparatus 10 has not been received by the mobile terminal 20.

In this instance, the user will notice that the door of the vehicle 1 has not been locked and try to repeat the door lock manipulations of the manipulation unit 23 thereby to surely lock the door. If the door locking is successfully attained in the end, the signal indicating the SOC will be received by the mobile terminal 20.

Based on the fact that the user strongly desires to ensure locking of the door of the vehicle 1, success and failure in locking the door of the vehicle 1 can be linked or related to the success and failure in receiving the signal indication the SOC, respectively. Thus, the signal indicating the SOC can be received by the mobile terminal 20 surely.

At the door lock time, the plug state signal in addition to the information about the SOC is transmitted to the mobile terminal 20. If the plug state signal indicates ON, it is surely determined that the subject vehicle 1 is connected to the charge device 30.

By thus transmitting the plug state signal indicating that the battery 2 is connected to the external power source outside the vehicle 1 at the door lock time, the plug state signal can be received surely by the mobile terminal 20 as well as the signal of the SOC. Thus, even if the user is at the remote place (for example, in home), which is away from the vehicle 1, the user can confirm that the battery 2 is connected to the power source 30. The user often becomes uncertain about whether the vehicle 1 has been connected to the charge device 30 through the power supply wire 8. The user further returns to the vehicle again only to confirm that the vehicle 1 is connected to the charge device 30.

At the door lock time, the charge state signal is transmitted to the mobile terminal 20 as well as the information indicating the SOC. If the charge stat signal indicates "ON," the battery 2 is charged by the charge device 30.

At the door lock time, the charge state signal, which indicates that the battery 2 is being charged by the external power source outside the vehicle 1, is transmitted to the mobile terminal 20. As a result, similarly to the signal indicating the SOC, the charge state signal is surely received by the mobile terminal 20. The user is thus enabled to confirm that the battery 2 is being charged even when the user is at the remote place (for example, at home) from the vehicle 1. The user need not return to the vehicle again after leaving the vehicle 1 away for just confirming whether the battery 2 is being charged.

When the reception of the door lock signal is detected at step 110 in FIG. 2, the in-vehicle control unit 14 controls the in-vehicle radio unit 11 to transmit the signal indicating the SOC of the battery 2 to the mobile terminal 20 immediately as a signal, which is transmitted first after receiving the door lock signal. That is, no signal such as confirmation response, etc. is transmitted between steps 110 and 120.

Thus, the in-vehicle door control apparatus 10 transmits the signal indicating the SOC of the battery 2 to the mobile terminal 20 immediately as the first signal to be transmitted after detection of the reception of the door lock signal. That is, the signal indicating the SOC can be transmitted without transmission of the confirmation response indicating reception of the door lock signal, after the door lock signal is received. As a result, concurrency of the reception of the door lock signal and the transmission of the signal indicating the SOC of the battery 2 can be enhanced. Thus, the mobile terminal 20 can more readily receive the signal indicating the SOC of the battery 2.

When the manipulation unit 23 of the mobile terminal 20 receives the door lock manipulation (step 305), the mobile control unit 27 starts the power supply to the mobile radio unit 21 (step 310), transmits the predetermined door lock signal to the vehicle 1 (step 315), and continues to supply the electric power to the mobile radio unit 21 until the mobile radio unit 21 receives the signal indicating the SOC of the battery 2 (step 230). When the signal indicating the SOC is received, the mobile control unit 27 turns off the power supply to the mobile radio unit 21 (step 235).

It is generally required that the electric power is supplied to the mobile radio unit 21 only when it is necessary thereby to save the electric power for the radio communications. According to the present embodiment, it is necessary that the mobile terminal 20 not only transmits and receives the door lock signal but also receives the signal indicating the SOC of the battery 2 from the vehicle 1. Based on this assumption, the mobile terminal 20 according to the present embodiment receives the signal indicative of the charge amount of the battery 2 from the vehicle at generally the same time as the transmission of the door lock signal. As a result, increase in the power consumption by the mobile terminal 20 can be suppressed, even if the power supply to the terminal 21 is continued in the period between the transmission of the door lock signal. If the time of transmission of the door lock signal and the time of reception of the signal indicating the SOC of the battery 2 differ greatly, the power supply to the mobile radio unit 21 must be turned on and off before and after the time of transmission of the door lock signal and further the power supply to the mobile radio unit 21 must be turned on and off again before and after the time of reception of the signal indicating the SOC, so that the power consumption may be reduced. This results in redundancy and increases processing load.

According to the present embodiment, further, the time of reception of the signal indicating the SOC is generally the same as the time of transmission of the door lock signal. As a result, the time of reception of the signal indicating the SOC is limited to some extent. If the times are different and the time of reception of the signal indicating the SOC is not predictable, the power supply to the mobile radio unit 21 must be turned on persistently to wait for the signal of the SOC. This will increase the power consumption wastefully.

The operation of the vehicle door control system is further described with respect to a case, in which the user leaves the vehicle 1 once and returns to the vehicle 1 again. The mobile control unit 27 repetitively (for example, at regular interval of one minute) executes a program 500 shown in a flowchart form in FIG. 6 after step 330 until the door lock manipulation is performed on the manipulation unit 23. That is, this flowchart corresponds to display processing, which the mobile control unit 27 repeats while the user is away from the vehicle 1.

Since this program 500 is executed within one second, it is executed almost at the same time or in a moment. The time period, in which this program 500 is executed, corresponds to one display time.

In execution of the program 500, the mobile control unit 27 first calculates an elapse of time T1 at step 510. The elapse of time T1 indicates an elapse of time from the day and time received and stored at step 320 in FIG. 4 to the present day and time.

At step 520, the mobile control unit 27 calculates an estimated charge increase amount Q1 of the battery 2 at the present time (that is, display time). That is, the mobile control unit 27 calculates the amount of charge, which is estimated to have increased during the elapse of time T1. Specifically, the estimated charge increase amount Q1 is determined as a result of multiplication of the charge level by the elapse of time T1. Here, the charge level is an amount of increase in the charge amount of the battery 2 while the electric power is being supplied to the charge device 30.

This charge level may be a numerical value inputted by the user by manipulation on the manipulation unit 23. In this instance, the manipulation unit 23 may be required to have a numeric input part (for example, ten keys) for inputting numeric values in addition to the door lock button and the door unlock button.

Alternatively, the charge monitor unit 5 may detect the electric power (in unit of kW) inputted from the charge device 30 into the battery 2 at the time of the start of charging and outputs the detected power to the in-vehicle control unit 14. The in-vehicle control unit 14 may transmit a signal indicating this input power together with the signal indicating the SOC at step 120 in FIG. 2. The mobile control unit 27 may receive and store the input power at step 320 in FIG. 4. The stored input power may be used as the charge level in step 520. That is, the charge level may be determined by actually sensing the amount of power supplied from the charge device 30 at the time of charging.

At step 530, the mobile control unit 27 calculates an estimated total charge amount Q2, which is an estimate charge amount, of the battery 2 at the present time. That is, the estimate charge amount of the battery 2 at the present time is calculated. Specifically, the estimated total charge amount Q2 is calculated by adding the estimated charge increase amount Q1 to an initial charge amount Q. Here, the initial charge amount Q is set to the charge amount in the SOC received and stored at step 320 in FIG. 4. That is, the initial charge amount Q is the charge amount of the battery 2 at the time of door locking and substantially the charge amount of the battery 2 at the time of the start of charging.

At step 540, a predicted travel distance L is calculated. The predicted travel distance L is a predicted total travel distance, which the vehicle 1 will be able to travel, under the assumption that the vehicle 1 starts to travel with the charge amount of the battery 2 being the estimated total charge amount Q2 and continues to travel without additional charging until the charge amount of the battery 2 is reduced to zero. The predicted travel distance L is specifically determined by dividing the estimated total charge amount Q2 by an electric power consumption rate.

The electric power consumption rate is the amount of power of the battery 2, which the vehicle 1 consumes in traveling a unit travel distance.

This power consumption rate may be inputted numerically by the user by manipulating the manipulation unit 23. In this instance, the manipulation unit 23 is required to have the numerical value input part (for example, ten keys) for inputting numeric values in addition to the door lock button and the door unlock button. Since the predicted travel distance L (predicted value of distance, which the vehicle will be able to travel) can be calculated by using the power consumption rate inputted by the user, the predicted travel distance L can be calculated accurately by using the information of a person, who knows most about the electric power consumption rate of the vehicle 1.

Alternatively, the electric power consumption rate may be determined by averaging, by the travel distance, the amounts of decrease in the charge amount of the battery per unit distance, which is acquired when the vehicle 1 traveled in the past. The information about changes in the charge amount of the battery 2 at the time of the travel of the vehicle 1 in the past may be acquired by storing the SOC information, which the charge monitor unit 5 repetitively outputted to the in-vehicle control unit 14 in the flash memory and retrieving it from the flash memory at the time of calculating the power consumption rate.

The in-vehicle control unit 14 further stores, in the flash memory, the SOC acquired repetitively from the charge monitor unit 5 together with the travel distance information at that time in the linked manner based on the information of a travel distance sensor of the vehicle 1, which is not shown. Thus it is made possible that the in-vehicle control unit 14 retrieves the SOC information about each travel distance from the flash memory at the time of calculating the power consumption rate, calculates the average value of the decrease in the charge amount of the battery 2 per unit travel distance based on the retrieved SOC information and determines this averages value to the power consumption rate. The in-vehicle control unit 14 may transmit the signal indicating the power consumption rate together with the SOC signal and the like at step 120 in FIG. 2. The mobile control unit 27 may receive and store the power consumption rate at step 320 in FIG. 4 so that the stored power consumption rate may be used at step 520.

Since the predicted travel distance L (predicted value of the distance, which the vehicle 1 will be able to make) can thus be calculated based on the past travel data of the vehicle 1, the predicted travel distance L can be determined more accurately by reflecting the characteristics and the condition of use of the vehicle 1.

At step 550, the mobile control unit 27 displays the predicted travel distance L calculated at step 540 on the mobile notification unit 24a.

Figure 7:
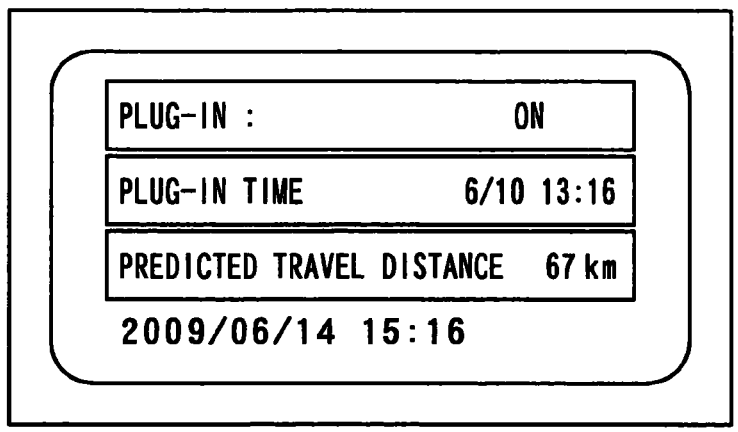
FIG. 7 is a diagrammatic view showing an example of indication on a display unit of a mobile terminal 20.

One example of the display on the mobile notification unit 24a provided at step 550 is shown in FIG. 7. As shown in this figure, the mobile notification unit 24a is configured to display the present day and time and the elapse of time T1 (plug-in time) in addition to the predicted travel distance L. It is also possible to further display the same information additionally as that provided at step 330, that is, "PLUG-IN ON" indicating that the charge device 30 is connected to the connector 6 through the power supply wire 8. After step 550, one execution of the program 500 ends.

Thus, the mobile terminal 20 calculates and displays the predicted travel distance L, which the vehicle will be able to travel with the estimated total charge amount Q2 calculated at each display time. As a result, the user can grasp instinctively how long the vehicle 1 can travel with the presently available charge of the battery 2. This estimated total charge amount Q2 is one example of the amount related to the estimate charge amount.

The battery 2 is normally charged to full capacity by receiving sufficient electric power supply from the charge device 30, while the user is away from the vehicle 1. When the in-vehicle control unit 14 determines at step 240 in FIG. 3 that the battery 2 has been charged fully based on the SOC signal of the charge monitor unit 5, the in-vehicle control unit 14 sets the value of the charge flag to OFF at step 250, and controls the charge control unit 3 to finish the charging of the battery 2 by the charge device 30 at step 260. Then the in-vehicle control unit 14 repeats the program 200 from the beginning again and waits until the plug of the cable 7 is plugged in to the plug receptacle 31. Thus, when the battery 2 is fully charged, the charging is stopped automatically.

The operation of the vehicle door control system is described next with respect to the case, in which the user returns near the vehicle 1 to get in the vehicle 1. The in-vehicle control unit 14 is configured to execute a program 600 shown in the flowchart form in FIG. 8. This program 600 is executed immediately after the door of the vehicle 1 is locked. The program 600 is executed continuously while the door is in the locked state, since this program 600 ends after the door is locked. The mobile control unit 27 is also configured to execute normally repetitively a program 700 shown in the flowchart form in FIG. 9 to accept the door unlock manipulation. The normal processing, which is executed when the user approaches the vehicle 1 and then gets in the vehicle 1, is shown in FIG. 10.

It is assumed that the user carrying the mobile terminal 20 approaches to the vehicle 1 so that the mobile terminal 20 enters the range, in which the terminal is capable of communications with the in-vehicle door control apparatus 10 (stage 810). The user then pulls out the plug of the cable 7 from the plug receptacle 31 (stage 820). Pulling out the plug is necessary to protect the vehicle 1, the cable 7 and the charge device 30 from being damaged by the movement of the vehicle 1.

If the battery 2 has been fully charged at this moment, charging of the battery 2 will have been finished already. If the battery 2 has not been fully charged and is still being charged at this moment, the in-vehicle control unit 14 controls the charge control unit 3 to stop charging after detecting that the plug has been pulled out or disconnected based on the signal from the plug state detection unit 4. Thus, the execution of the program 200 shown in FIG. 3 is finished. It is possible to execute the program 200 again from the beginning.

The user then performs the door lock manipulation on the manipulation unit 23 of the mobile terminal 20 (stage 830). The mobile control unit 27 determines that step 710 in FIG. 9 that the door unlock manipulation has been performed and executes step 720.

The mobile control unit 27 controls the power control unit 26 at step 720 to turn on the power supply to the mobile radio unit 21, which has been turned off. The mobile radio unit 21 is thus enabled to perform the short range communications by using the mobile radio unit 21.

At step 730, the mobile control unit 27 controls the mobile radio unit 21 to transmit the door unlock signal, the contents of which is predetermined, to the in-vehicle door control apparatus 10. According to the present embodiment, the contents of this door unlock signal is different from that of the above-described door unlock signal. At next step 740, the mobile control unit 27 waits for the reception of the plug state signal transmitted from the in-vehicle door control apparatus 10.

Figure 8:
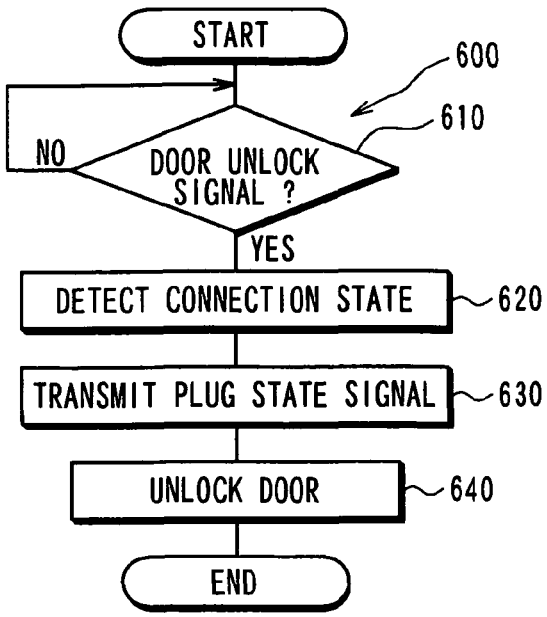
FIG. 8 is a flowchart showing a program, which is executed by the in-vehicle control unit immediately after the vehicle door is locked.

When the in-vehicle radio unit 11 receives the door unlock signal transmitted from the mobile terminal 20 (stage 840), the in-vehicle control unit 14 determines at step 610 in FIG. 8 that the door unlock signal has been received, and executes step 620. At step 620, the in-vehicle control unit 14 detects the plug state based on the signal from the plug state detection unit 4 (stage 850). The plug state indicates whether the plug of the cable 7 is being inserted into the plug receptacle 31 or not, that is, whether the connector 6 and the charge device 30 are connected through the power supply wire 8.

In this example, it is assumed that the plug of the cable 7 has been pulled out before the user performs the door unlock manipulation, the plug state is detected as being not connected to the power supply wire 8. However, if the user has forgotten pulling out the plug of the cable 7 before performing the door unlock manipulation, the plug state corresponds to the indication that the connector 6 and the charge device 30 are connected through the power supply wire 8.

At step 630, the in-vehicle control unit 14 controls the mobile radio unit 21 to transmit the signal indicating the state of connection detected at step 620 (plug state signal) to the in-vehicle door control apparatus 10. Thus, the mobile radio unit 21 transmits the plug state signal (stage 860).

At step 640, the in-vehicle control unit 14 controls the door control unit 13 to unlock the door and then finish the program 600. By the control of step 130, the door of the vehicle 1 is locked (stage 870). After the door is unlocked, the user opens the door and gets in the vehicle (stage 880).

The mobile terminal 20 is configured to transmit the door unlock signal in response to the door unlock manipulation on the manipulation unit 23. Therefore, determination at step 610 indicating that the door unlock signal has been received corresponds to determination indicating that the door unlock signal transmitted in response to the door unlock manipulation is received. Since the door is unlocked at step 640 based on the determination that the door unlock signal has been received at step 610, the determination of step 610 indicating that the door unlock signal has been received indicates the determination that the door of the vehicle 1 should be unlocked.

The operation from the time the door unlock manipulation has been performed on the manipulation unit 23 at stage 830 in FIG. 10 to the time that the door is unlocked at stage 870 is performed in a moment and almost at the same time. Therefore, the period from stage 830 to stage 870 and a short period (for example, one second) immediately after stage 870 corresponds to the time (door lock time), at which the door of the vehicle 1 is determined to be locked.

Figure 9:
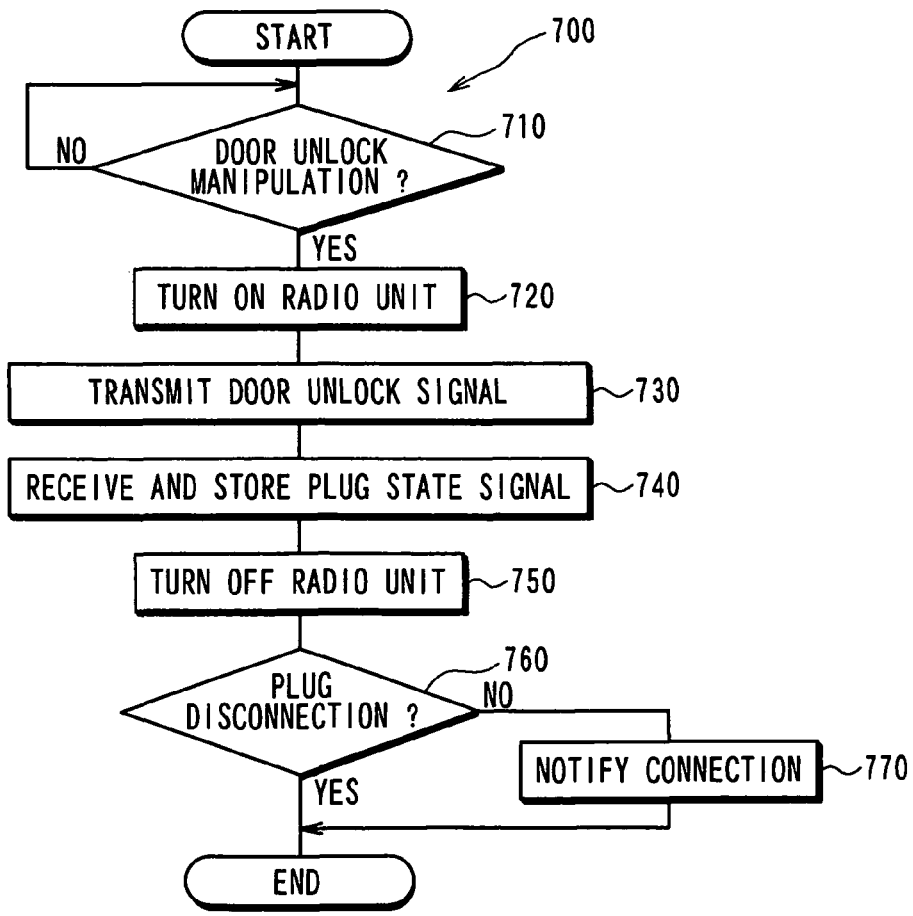
FIG. 9 is a flowchart showing a program, which is executed normally in repetition by the mobile control unit to accept a door unlock manipulation.
Figure 10:
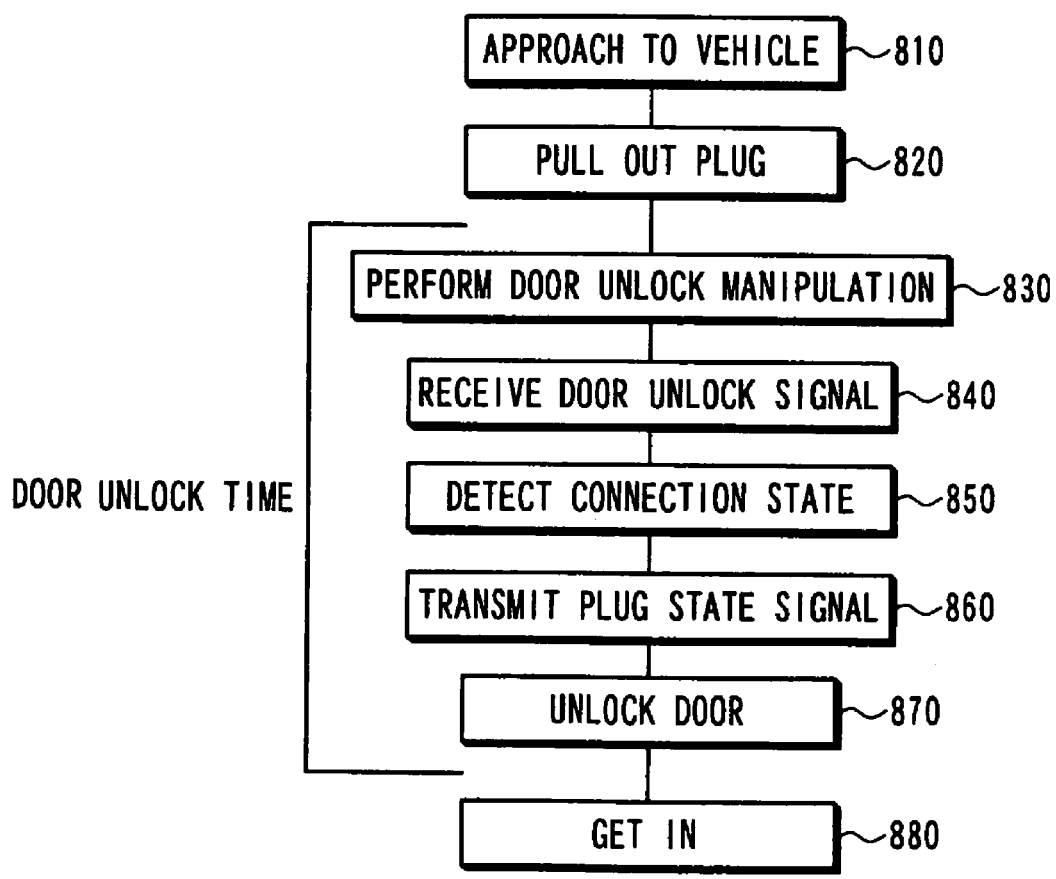
FIG. 10 is a sequence of operations, which normally occur between the user and the vehicle, when the user approaches the vehicle, unlocks and then gets in the vehicle.

When the mobile radio unit 21 of the mobile terminal 20 receives that plug state signal transmitted at stage 860, the mobile control unit 27 stores the contents of the received plug state signal in the RAM or the flash memory at step 740 in FIG. 9. At step 750, the mobile radio unit 21 controls the power control unit 26 at step 750 to turn off the power supply to the mobile radio unit 21.

The mobile control unit 27 checks at step 760 whether the plug of the cable 7 is connected to or disconnected, that is, the connector 6 is connected or disconnected to and from the external charge device 30 based on the contents of the plug state signal received and stored at step 740, which is immediately before step 760.

According to the present embodiment, the plug state signal indicating that the connector 6 is not connected to the charge device 30. As a result, the check at step 760 results in YES and the execution of the program 700 is finished. Then, the program 700 is executed again to wait for the door unlock signal at step 710.

If the user forgets pulling out the plug before the door unlock manipulation, the plug state signal, which the mobile control unit 27 receives at step 740, indicates that the connector 6 is still being connected to the charge device 30. In this case, the check at step 760 results in NO and notification of connection of the plug is performed to the user at step 770. Thus, the user is reminded that the plug should be pulled out. For notification to the user, for example, the vibration 24b may be activated to transfer the vibration or the speaker 24c may be activated to generate beep sound.

After step 770, the program 700 is finished once and performed again to wait for the door unlock manipulation at step 710.

Thus, when the user carrying the mobile terminal 20 returns to the vehicle 1 (stage 810), the plug state signal is transmitted from the in-vehicle door control apparatus 10 to the mobile terminal 20 (stage 860). The mobile terminal 20 checks, based on the received plug state signal, whether the battery 2 is being connected to the external power source (step 760). If the battery 2 is being connected to the external power source, the connection is notified as a warning or alarm (step 770).

Further, when the predetermined door unlock signal is transmitted from the mobile terminal 20 to the in-vehicle door control apparatus 10, the in-vehicle door control apparatus 10 determines that the manipulation unit 23 has accepted the door unlock manipulation and received the door unlock signal (step 610). The apparatus 10 unlocks the door at the determined door unlock time (step 640) and transmits the plug state signal (step 630). More specifically, the door is unlocked immediately after transmission of the plug state signal. Therefore, the time of notification for warning is substantially the same as the door unlock time.

This door unlock time is immediately before the user gets in the vehicle 1, and most appropriate as the time for notification for warning that the power supply wire 8 is forgotten from being pulled out. This is because the normal process of using the vehicle 1, which has been charged, is that the user first pulls out the power supply wire 8 and then unlocks the door to get in the vehicle 1.

If the notification is performed as the warning, differently from the present embodiment, for example, immediately when the user returns to the vehicle 1 and the mobile terminal 20 and the in-vehicle door control apparatus 10 become communicable each other, it is likely that such notification will be issued before the user acts to disconnect the power supply wire 8. In this case, the user will be annoyed by such warning.

Further, if the notification is performed as the warning, for example, when the user gets in the vehicle and starts to drive the drive power source (engine, motor or the like) of the vehicle 1, the user will be obligated to get off the vehicle 1 to disconnect the power supply wire 8 and returns to the get in the vehicle 1 after disconnecting the power supply wire 8.

According to the present embodiment, however, the notification is issued as the warning at the time of door unlocking, which is performed when the user intends to get in the vehicle 1 but before the user actually gets in the vehicle 1. Therefore, this time point of notification is the most appropriate point to warn that the power supply wire 8 is left connected and need be disconnected.

When the in-vehicle control unit 14 detects the reception of the door unlock signal at step 610 in FIG. 8, the in-vehicle control unit 14 controls the in-vehicle radio unit 11 to immediately transmit the plug state signal to the mobile terminal 20 at step 630 as a signal, which is transmitted first after the reception of the door unlock signal. That is, no signal such as the confirmation response or the like is transmitted between steps 610 and 630.

Thus, the in-vehicle door control apparatus 10 transmits the plug state signal to the mobile terminal 20 immediately as the signal, which is transmitted first after detection of the reception of the door unlock signal. Thus, the plug state signal can be transmitted after the reception of the door unlock signal without transmission of the confirmation response or the like, which indicates that the door unlock signal has been received. In addition, it is possible to issue the notification as the warning, which indicates that the power supply wire 8 is left connected, at the appropriate time.

Further, when the manipulation unit 23 receives the door unlock manipulation (step 710), the mobile control unit 27 of the mobile terminal 20 starts to turn on the power supply to the mobile radio unit 21 (step 720) and then transmits the predetermined door unlock signal to the vehicle 1 (step 730). The mobile control unit 27 continues to supply the mobile radio unit 21 with the power until the mobile radio unit 21 receives the plug state signal (step 740). When the plug state signal is received, the mobile control unit 27 turns off the power supply to the mobile radio unit 21 (step 750).

It is generally required to turn on the power supply to the mobile radio unit 21 only when the communications is necessary, so that the power consumption for the communications is saved. According to the present embodiment, the mobile terminal 20 is required to receive the plug state signal from the vehicle 1 in addition to the transmission and reception of the door unlock signal. The terminal 20 receives the plug state signal from the vehicle 1 at the same time as the transmission of the door unlock signal. As a result, even if the power supply to the mobile radio unit 21 is continued during a period, which includes both of the transmission of the door unlock signal and the reception of the plug state signal, the power consumption in the mobile terminal 20 is suppressed from increasing.

If the transmission of the door unlock signal and the reception of the plug state signal differ in time considerably, it is necessary to turn on and off the power supply to the mobile radio unit 21 before and after the time of transmission of the door unlock signal so that the power consumption is reduced. It is also necessary to turn on and off the power supply to the mobile radio unit 21 before and after the time of reception of the plug state signal. This control is redundant resulting in an increase in the processing load.

According to the present embodiment, since the time to receive the plug state signal is generally the same as the time of transmission of the door unlock signal, the time for receiving the plug state signal is limited to some extent. If it is not certain when the plug state signal will be received, the power supply to the mobile radio unit 21 need be continued to wait for the plug state signal thus causing an wasteful increase in the power consumption.

In the present embodiment, the in-vehicle control unit 14 operates as one example of a door lock check section by executing step 110 in FIG. 2, as one example of a transmission control section by executing steps 120 and 130, as one example of a door unlock check section by executing step 610 in FIG. 8, and as one example of an unlock section by executing steps 620, 630 and 640.

(Second Embodiment)

The second embodiment is different from the first embodiment in that the charge device 30 is configured to transmit the information of the charge state of the battery 2 to the mobile terminal 20 (for example, a cell phone having a function of radio communications of a keyless entry system) after the door of the vehicle 1 has been locked (stage 490 in FIG. 5) and the user has left the vehicle 1 (stage 495).

Figure 11:
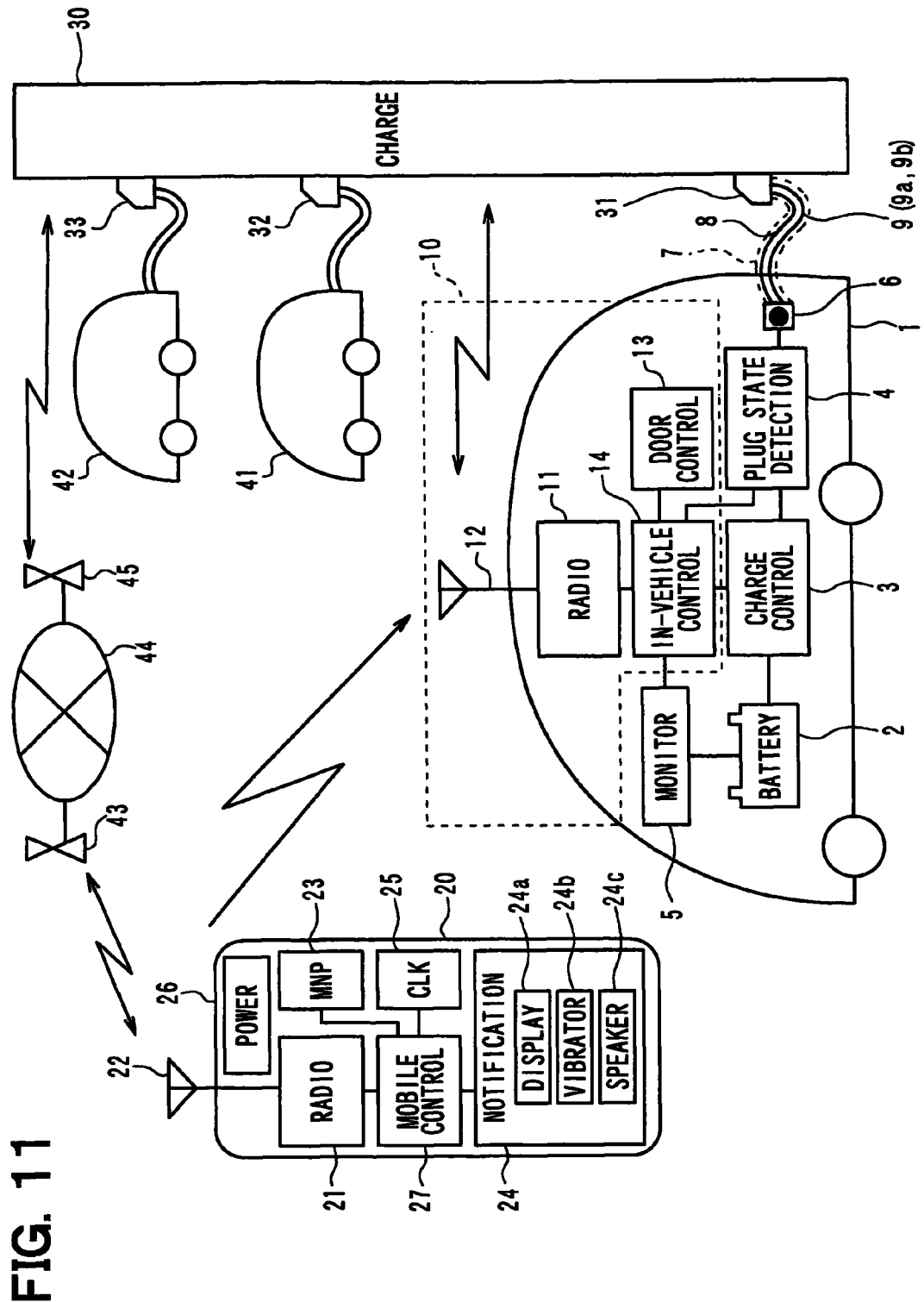
FIG. 11 is a schematic view of a vehicle door control system according the second embodiment of the present invention.

The vehicle door control system according to this embodiment, which is also a charge state notification system, is shown in FIG. 11. The charge device 30 has plug receptacles 32 and 33 in addition to the plug receptacle 31 so that a plurality of vehicles 1, 41 and 42 may receive electric power for charging respective batteries through the plug receptacles 31 to 33 at the same time.

The in-vehicle radio unit 11 of the in-vehicle door control apparatus 10 has a function of performing the short range radio communications with the charge device 30 in addition to the function of the short range radio communications. As the short range radio communications, communications by W-LAN, Zigbee or Bluetooth, for example, may be adopted.

The mobile radio unit 21 of the mobile terminal 20 has a function of the short range radio communications and the long range radio communications with the charge device 30 in addition to the function of the short range radio communications with the in-vehicle door control apparatus 10. As the short range radio communications, communications by W-LAN, Zigbee or Bluetooth, for example, may be utilized. As the long range distance communications, radio communications, which connects to a radio base station 43 by the cell phone communications and further connects to the charge device 30 through a wide area network (for example Internet) 44 connected to the radio base station 43. The charge device 30 is capable of communicating with the wide area network 44 by being connected by radio to a radio base station 45 connected to the wide area network 44 or by being directly connected by wire to the wide area network 44.

Figure 12:
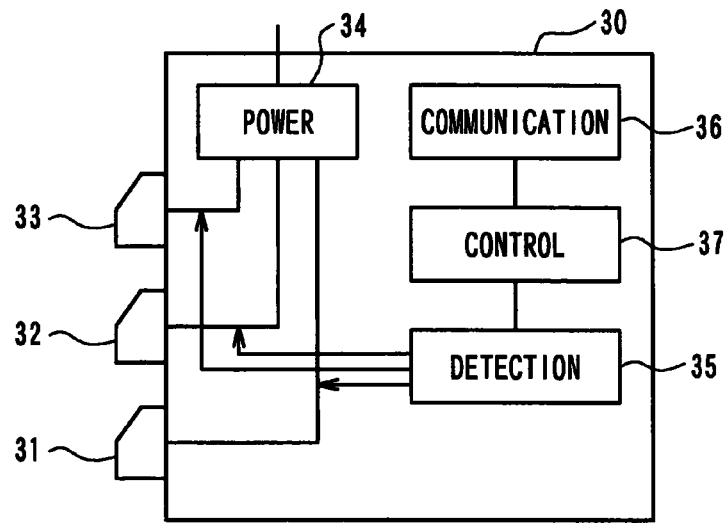
FIG. 12 is a block diagram showing a charge device.

The charge device 30 is configured in detail as shown in FIG. 12 in the present embodiment. The charge device 30 is equipped with a power supply unit 34, a detection unit 35, a communications unit 36 and a control unit 37 in addition to the plug receptacles 31 to 33.

The power supply unit 34 is connected to a power supply wire, which is connected to an external power source (for example, a transformer connected to a power supply cable provided by an electric power company). The power supply unit 34 converts the AC power supplied from the power supply cable to the DC power and supplies the converted DC power to each of the plug receptacles 31 to 33. By connecting the power supply wires of the vehicle to the plug receptacles 31 to 33, the vehicles receive the charging power from the power supply unit 34 through the plug receptacles 31 to 33.

The charge detection unit 35 detects DC currents supplied from the power supply unit 34 to the plug receptacles 31 to 33 and outputs signals indicating the detected DC currents to the control unit 37.

The communications unit 36 has a function of both the short range radio communications and the long range radio communications with the mobile terminal 20. For such a function, the communications unit 36 is configured to perform signal processing, which include baseband processing, frequency conversion, modulation, demodulation, amplification and the like, under control by the control unit 37. In case of the short range radio communications, the communications unit 36 directly communicates with the mobile terminal 20. In case of the long range radio communications, as shown in FIG. 11, the communications unit 36 communicates with the mobile terminal 20 through the wide area network 44 by radio-connecting to the radio base station 45 connected to the wide area network 44 or by directly wire-connecting to the wide area network 44.

The communications unit 36 has a function of performing the short range radio communications with the in-vehicle door control apparatus 10 in addition to the function of communications with the mobile terminal 20. As the short range radio communications, communications by W-LAN, Zigbee or Bluetooth, for example, may be utilized.

The control unit 37 (one example of the charge state monitor apparatus) includes a microcomputer, which is equipped with a CPU, a RAM, a ROM, a flash memory and the like. The CPU executes a control program stored in the ROM. Specifically, in execution of such a program, the CPU retrieves data from the RAM, the ROM and the flash memory, stores data in the RAM and the flash memory, receives signal from the detection unit 35 and controls the communications unit 36 thereby to communicate with the in-vehicle door control apparatus 10 and the mobile terminal 20. The operation of the control unit 37 will be described later in detail.

The operation of the vehicle door control system according to the present embodiment will be described below with particular reference to parts, which are additional to the first embodiment. The in-vehicle control unit 14 of the in-vehicle door control apparatus 10 regularly (for example, at every 30 seconds) controls the in-vehicle radio unit 11 to transmit the signal indicating the present charge amount of the battery 2, a vehicle ID signal and a cell phone ID signal to the charge device 30, while the power is being supplied from the charge device 30 for charging the battery 2.

The vehicle ID signal is a signal, which includes identification information (that is, vehicle ID) that uniquely specifies the vehicle 1. The vehicle ID may be an in-vehicle device ID, for example, which is pre-stored in the ROM of the in-vehicle control unit 14. The cell phone ID signal is a signal, which includes contact information (cell phone ID) used to transmit information to the cell phone 20 carried by the user of the vehicle 1. The cell phone ID may be an electronic mail address, at which the mobile terminal 20 can receive messages.

The control unit 37 of the charge device 30 receives the signal indicating the charge amount, the vehicle ID signal and the cell phone ID signal through the communications unit 36. The control unit 37 stores a received set of data including the charge amount and the reception time in the RAM, etc with respect to each vehicle ID in the vehicle ID signal. Thus, the control unit 37 is capable of detecting and storing the changes in the charge amount of the battery 2 mounted in the vehicle 1 with respect to time.

The control unit 37 determines the correspondence between the vehicles and the plug receptacles 31 to 33, that is, which one of the vehicles 1, 41 and 42 receives charge from which one of the plug receptacle 31 to 33, based on the coincidence of time between the start of communications and the start of charging from the plug receptacles 31 to 33. That is, the control unit 37 persistently monitors whether the power supply from each of the plug receptacles 31 to 33 has been started based on the signals from the detection unit 35. Further, when the control unit 37 receives the vehicle ID signal of the new vehicle ID and the signal indicating the charge amount through the communications unit 36, the control unit 37 associates one plug receptacle with the vehicle ID and the cell phone ID. This one plug is a plug receptacle, which has started to supply electric power in a predetermined period (for example, 10 seconds) before and after the reception of the vehicle ID signal.

Figure 13:
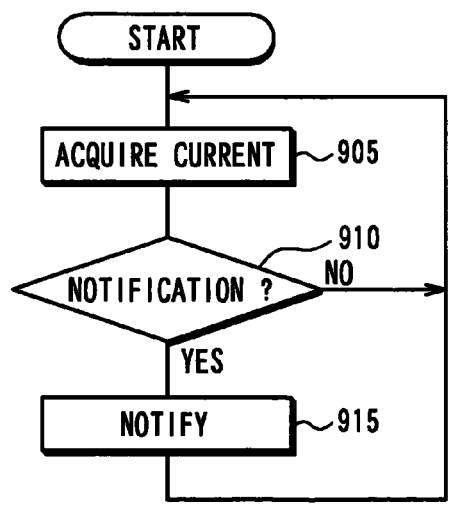
FIG. 13 is a flowchart showing notification processing executed by a control unit of the charger.

The control unit 37 of the charge device 30 is configured to regularly execute notification processing shown in FIG. 13. In the same manner as in the, first embodiment, this notification processing is executed regularly even after the door of the vehicle 1 has been locked (stage 490 in FIG. 5) and the user has left the vehicle 1 (stage 495).

In the notification processing, the control unit 37 acquires detected current values of currents flowing from the power supply unit 34 to the plug receptacles 31 to 33 at step 905 based on the signals of the detection unit 35.

At step 910, the control unit 37 checks whether notification of charge state should be provided to the mobile terminal corresponding to the vehicle connected to the plug receptacle with respect to each of the plug receptacles 31 to 33. In case of the plug receptacle 31, as an example, the control unit 37 checks whether notification of the charge state of the battery 2 of the vehicle 1 should be provided to the mobile terminal 20 corresponding to the vehicle 1 connected to the plug receptacle 31 based on the current value of the current, which is acquired at step 905 as flowing to the plug receptacle 31.

If there is no mobile terminal, which needs notification, as a result of the check with respect to each plug receptacle, the control unit 37 repeats the same processing starting from step 905. If there is a mobile terminal, which needs the notification, the control unit 37 transmits a signal to the cell phone ID of such a cell phone at step 915. This signal indicates the charge state of the battery (battery 2 in case of the vehicle 1). After step 915, step 905 and the subsequent steps are repeated. The charge state transmitted at step 915 includes the charge amount of the battery and information, which indicates the amount of electric source power E suppliable from the plug receptacle 31 of the charge device 30 to the vehicle 1.

The electric power amount E is a maximum electric power, which can be supplied to the battery 2 of the vehicle connected to the plug receptacle, as a capacity of the charge device 30 (or capacity of each plug receptacle 31 to 33). This electric power amount E is variable with the number of vehicles, which are connected to the charge device 30. Specifically, the electric power amount E of the plug receptacle 31 is the maximum when only one vehicle 1 is connected to the plug receptacle 31 and no other vehicles are connected to the plug receptacles 32 and 33. The electric power amount E of the plug receptacle 31 and the electric power amount E of the plug receptacle 32 are both reduced to be one half (½) of the maximum power amount, respectively, if the vehicles 1 and 41 are connected to the plug receptacles 31 and 32 but no vehicle is connected to the plug receptacle 33. The electric power amount E of each plug receptacle 31 to 33 is reduced to one third (⅓) of the maximum power amount, if the vehicles 1, 41 and 42 are connected to the plug receptacles 31 to 33, respectively. The electric power amount E will also be reduced, if the charge control unit 3 starts to supply more electric power to other electric loads (for example, lighting devices, motors or the like).

This electric power amount E is not related to the charge amount of the battery 2, to which the electric power is supplied. Even if the battery 2 is charged with the electric power amount E being maintained at a constant value, the amount of increase in the charge amount of the battery 2 per unit time generally decreases with time due to the characteristic of the battery. That is, even if the charge amount of the battery changes, the electric power amount E does not change because of such changes.

By executing the notification processing, the control unit 37 checks whether the notification of the charge state of the battery 2 should be provided to the mobile terminal 20 or the like. If it is determined that the notification is necessary, the control unit 37 transmits the charge state to the mobile terminal (for example, mobile terminal 20), which needs the notification at the time of such a determination.

Figure 6:
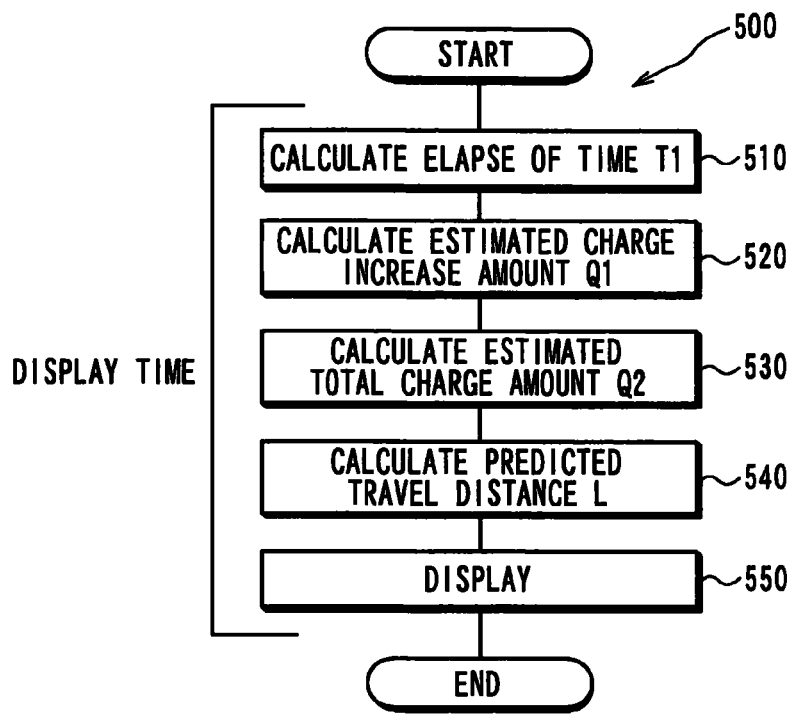
FIG. 6 is a flowchart showing a program, which is executed in repetition by the mobile control unit when the user is away from the vehicle.
Figure 14:
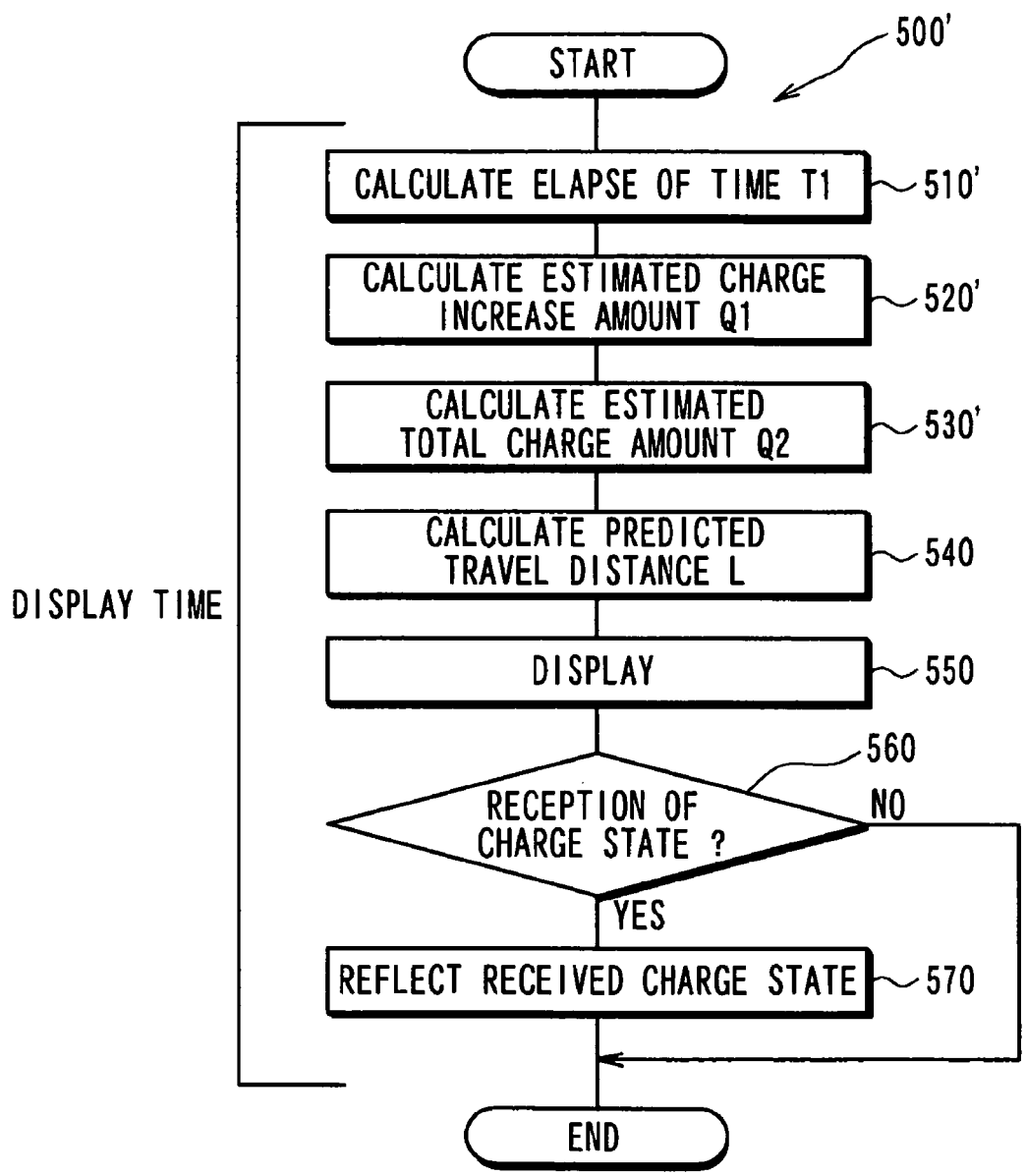
FIG. 14 is a flowchart showing display processing executed by a mobile control unit of a mobile unit.

The mobile control unit 27 of the mobile terminal 20 is configured to execute display processing shown in FIG. 14 in place of the display processing shown in FIG. 6, while the user is away from the vehicle 1. The processing at steps 540 and 550 in FIG. 14 are the same as those of steps 540 and 550 in FIG. 6.

The in-vehicle control unit 14 is configured to check whether a signal indicating the charge state has been received from the charge device 30 at step 560 following step 550. If it has not been received, the execution of one cycle of the display processing of FIG. 14 is finished. If it has been received, the charge state information included in the received signal is reflected at step 570 so that it may be used at steps 510', 520' and 530', which will be executed subsequently.

Specifically, the processing of steps 510', 520' and 530' are the same as those steps 510, 520 and 530 executed in the first embodiment, if the in-vehicle control unit 14 has not received the signal including charge state transmitted from the charge device 30.

If the charge state has been received at least once, the processing is changed as follows. At step 510', the elapse of time T1 is calculated. This elapse of time T1 indicates the period from the day and time (that is, the latest day and time of reception), at which the signal including the charge state has been received last time, to the present day and time.

At step 520', the estimated charge increase amount Q1 of the battery 2 at the present time (that is, display time) is calculated based on the source electric power E under the charge state, which has been received last (that is, latest charge state). Specifically, the estimated charge increase amount Q1 is set by multiplying the charge level by the elapse of time T1 as in the first embodiment. However, as the charge level in the second embodiment, the source electric power E received last in the course of charging is used.

Alternatively, the charge level may be set to a value of multiplication of the source electric power E received last in the course of charging by a predetermined coefficient K (positive value equal to 1 or less), which is variable with the charge amount received last in the course of charging.

It is possible to set the coefficient K to 1, if the charge amount in the course of charging is equal to or less than a predetermined value (for example 70%). It is also possible to set the coefficient K to decrease with the increase in the charge amount, if the charge amount is greater than the predetermined value. This is because the electric power actually stored in the battery 2 may change with the charge amount of the battery 2 even if the source electric power E is constant.

At step 530', the estimated total charge amount Q2 of the battery 2 at the present time is calculated. Specifically, the estimated total charge amount Q2 is set to a value, which is a sum of the initial charge amount Q and the estimated charge increase amount Q1. The initial charge amount Q is different from that in the first embodiment and is the charge amount received last in the course of charging.

The mobile control unit 27 thus can reflect the changes of the received charge amount and the electric power in the course of charging on the calculation of the estimated total charge amount Q2 of the battery 2.

The check operation performed at step 910 in FIG. 13 to check whether the charge state notification is necessary is described in more detail with respect to one of the plug receptacles 31 to 33. The plug receptacle 31 is assumed to be connected to the vehicle 1. The other plug receptacle 32 or 33 may be assumed to be connected to the vehicle 1.

[0] Assumption for Determination

According to the present embodiment, the source electric power E supplied from the plug receptacle 31 is detected in addition to the current flowing from the power supply unit 34 to the plug receptacle 31. This electric power E may be determined by dividing the maximum value (for example 30 kW) pre-stored in the ROM or the like of the control unit 37 by the number of vehicles N connected to the charge device 30. Whether the plug receptacles 31 to 33 are connected to vehicles is determined by whether electric currents are flowing from the power supply unit 34 to the plug receptacles 31 to 33.

It is noted that the electric power, which is actually supplied from a plug receptacle to a battery, is referred to as line power P to be distinguished from the source electric power E, which can be supplied from the plug receptacle. This line power P is calculated based on the current, which flows from the power supply unit 34 to the plug receptacle, and the predetermined voltage supplied from the power supply unit 34 to the plug receptacle.

[1] First Determination Method (Increase and Decrease of Electric Source Power E and Corresponding Change of Line Power)

According to the first determination method, it is determined to be necessary to notify the mobile terminal 20, which corresponds to the battery 2 connected to the plug receptacle 31, of the charge state of the battery 2, if both of the following conditions (A) and (B) are satisfied. The notification is determined to be unnecessary, if at least one of the conditions (A) and (B) is not satisfied.

(A) The electric source power E at the plug receptacle 31 has increased or decreased by an amount equal to or greater than a threshold value $\epsilon$.

(B) The electric source power E at the plug receptacle 31 and the line power P are equal to each other at present.

Specifically, the control unit 37 calculates the latest electric source power Ei and the latest line power Pi based on the latest currents supplied to the plug receptacles 31 to 33 detected at step 905 most recently. Similarly, the control unit 37 also calculates the previous electric source power Ei−1 and the previous line power Pi−1 based on the previous currents supplied to the plug receptacles 31 to 33 detected at step 905 previously. These previous values are calculated immediately or one cycle before the latest calculation. The suffix i is an integer.

Whether the condition (A) is satisfied is determined by checking whether the following inequality holds.

$$|Ei-Ei-1| \geq \epsilon$$

The threshold value $\epsilon$ is 0 for example, but may be a positive value greater than 0. Whether the condition (B) is satisfied is determined by checking whether the following equality or inequality holds.

$$Ei=Pi, \text{ or } |Ei-Pi|<\delta$$

In the case of inequality, the threshold value $\delta$ is a positive value (for example, equal to or less than Ei×1/1000), which is much smaller than Ei.

For example, the notification of the charge state is determined to be necessary at times shown in FIGS. 15 to 20, in the case of the first determination method.

In FIGS. 15 to 20, the solid line 51, the broken line 52 and the dot-and-chain line 53 indicate a time change in the source electric power E at the plug receptacle 31, a time change in the line power P supplied from the plug receptacle 31 to the battery 2 and a time change in the charge amount of the battery 2, respectively.

Figure 15:
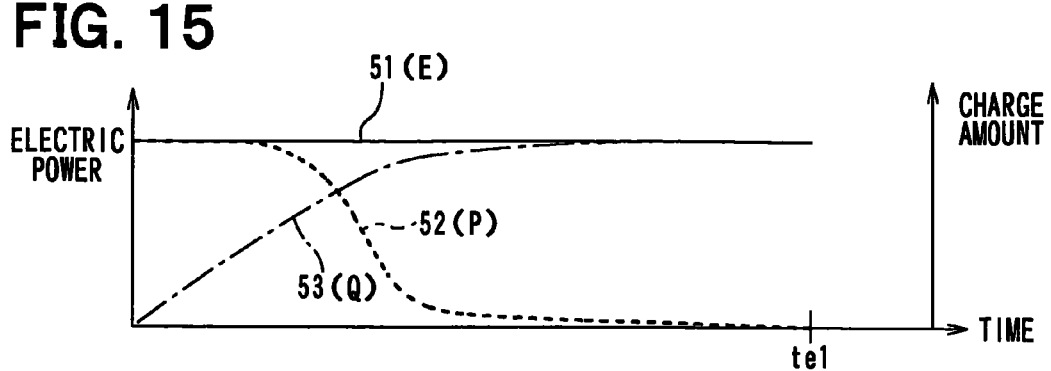
FIG. 15 is a schematic diagram showing an example of checking by a first and a second check methods whether a charge state notification is necessary.

FIG. 15 shows an example, in which no vehicles are connected to the plug receptacles 32 and 33 other than the plug receptacle 31 while the vehicle 1 is being connected to the plug receptacle 31 and charged.

In this example, since the electric power is supplied only from one plug receptacle 31 while the battery 2 is being charged, the electric source power 51 does not change. Even under this condition, the line power 52 decreases with the increase in the charge amount 53 due to the charge characteristics of the battery 2. In this example, since the electric source power 51 is constant, the condition (A) is not satisfied. It is therefore not determined that the notification of the charge state is necessary.

Figure 16:
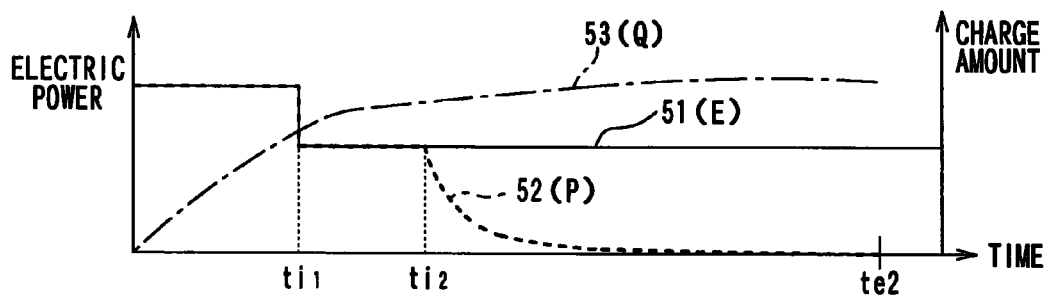
FIG. 16 is a schematic diagram showing an example of checking by the first and the second check methods whether the charge state notification is necessary.

FIG. 16 shows an example, in which one vehicle is connected to either one of the plug receptacles 32 and 33 at time ti1 while the vehicle 1 is being connected to the plug receptacle 31 and charged. The time ti1 is assumed to be in an early stage of charging.

In this example, since the time ti1 is in the early stage of charging, the line power 52 is substantially equal to the electric source power 51 before time ti1. The electric source power 51 at the plug receptacle 31 decreases to be lower than the line power 52 at time ti1, and accordingly the line power 52 also decreases to be equal to the electric source power 51.

Both conditions (A) and (B) are satisfied at time ti1, and hence the control unit 37 determines that the notification of the charge state is necessary. After time ti1, although the electric source power 51 does not change, the charge amount 53 increases gradually. As a result, the line power 52 starts to decrease at time ti2. In the example of FIG. 16, since the line power 52 decreases due to decrease of the electric source power 51 at time ti1, charge end time te2 is delayed relative to charge end time te1 shown in FIG. 15. The charge end time to indicates time, at which charging is completed. That is, the charge end time is delayed than that predicted at the time of start of charging, because of decrease of the electric source power 51.

Figure 17:
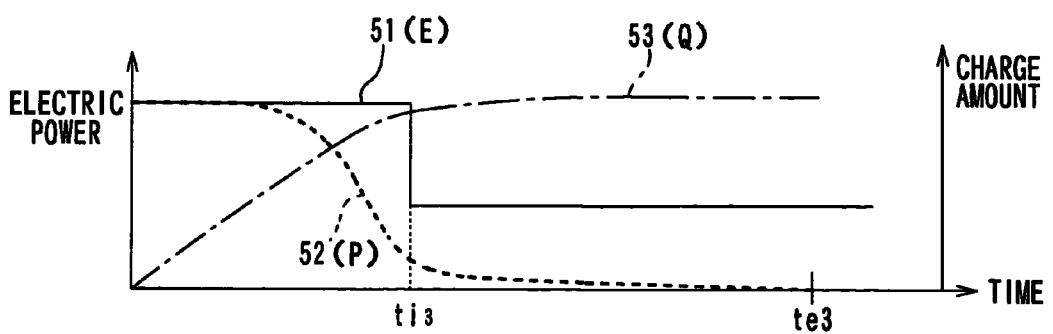
FIG. 17 is a schematic diagram showing an example of checking by the first and the second check methods whether the charge state notification is necessary.

FIG. 17 shows an example, in which one vehicle is connected to either one of the plug receptacles 32 and 33 at time ti3 while the vehicle 1 is being connected to the plug receptacle 31 and charged. The time ti3 is assumed to be in an intermediate stage of charging.

In this example, since the time ti3 is in the intermediate stage of charging, the line power 52 is much lower than the electric source power 51 immediately before the time ti3. Therefore, even if the electric source power 51 at the plug receptacle 31 decreases at time ti3, it is still higher than the line power 52.

At the time ti3, although the condition (A) is satisfied but the condition (B) is not satisfied. Therefore, the control unit 37 does not determine that the notification of the charge state is necessary. In the example of FIG. 17, it is not determined at any time that the notification of the charge state is necessary. In the example of FIG. 17, even if the source electric power 51 decreases at time ti3, the line power 52 does not decrease correspondingly. As a result, charge end time te3 becomes the same as the time te1 shown in FIG. 15.

Figure 18:
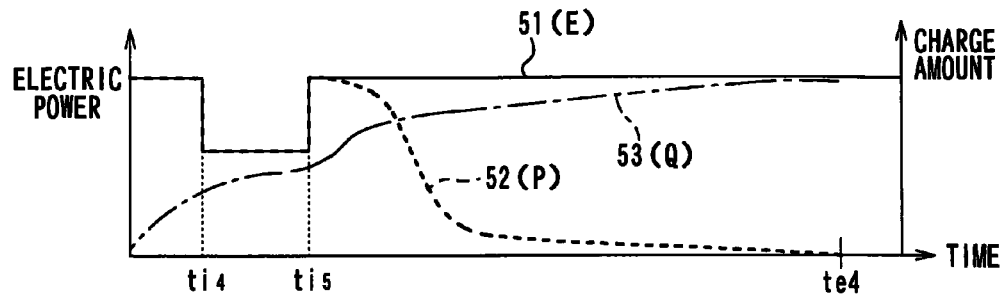
FIG. 18 is a schematic diagram showing an example of checking by the first and the second check methods whether the charge state notification is necessary.

FIG. 18 shows an example, in which one vehicle is connected to either one of the plug receptacles 32 and 33 at time ti4 while the vehicle 1 is being connected to the plug receptacle 31 and charged, and thereafter the vehicle connected to the plug receptacle 32 or 33 is disconnected at time ti5. The time ti4 is assumed to be in an early stage of charging.

In this example, the source electric power 51 at the plug receptacle 31 decreases to be lower than the line power 52 at time ti4 and the line power 52 also decreases to the same power as the source electric power 51. Since both of the conditions (A) and (B) are satisfied at time ti4, the control unit 37 determines that the notification of the charge state is necessary.

Then at time ti5, the source electric power 51 at the plug receptacle 31 increases and accordingly the line power 52, which has been limited by the source electric power 51, also increases to the same power as the source electric power 51. Since both conditions (A) and (B) are satisfied at time ti5, the control unit 37 determines that the notification of the charge state is necessary. In the example of FIG. 18, the control unit 37 determines at both times ti4 and ti5 that the notification of the charge state is necessary.

In the example of FIG. 18, since the line power 52 decreases in correspondence to the decrease of the source electric power 51 at time ti4, the charge end time predicted at that time is delayed to be later than the charge end time predicted at the time of start of charging. Further, since the line power 52 increases with the increase of the source electric power 51 at time ti5, the charge end time te4 predicted at that time is made earlier than the charge end time predicted at time ti4.

Figure 19:
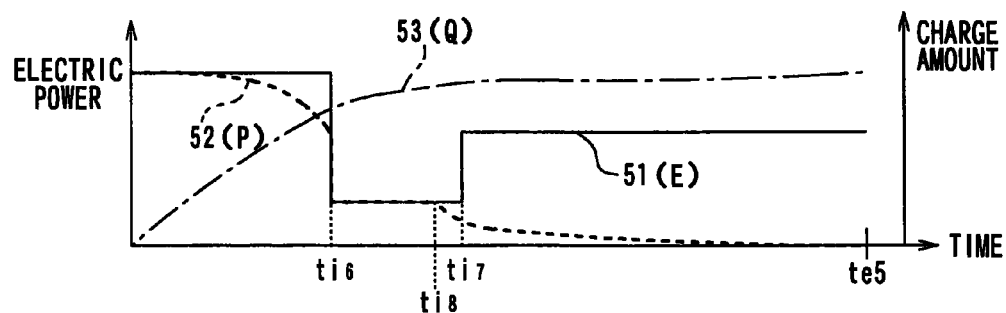
FIG. 19 is a schematic diagram showing an example of checking by the first and the second check methods whether the charge state notification is necessary.

FIG. 19 shows an example, in which two vehicles are connected to the plug receptacles 32 and 33 at time ti6, respectively, while the vehicle 1 is being connected to the plug receptacle 31 and charged, and thereafter one of the vehicles connected to the plug receptacles 32 and 33 is disconnected at time ti7.

In this example, the source electric power 51 at the plug receptacle 31 decreases to be lower than the line power 52 at time ti6 and accordingly the line power 52 also decreases to the same power as the source electric power 51. At time ti4, both conditions (A) and (B) are satisfied, the control unit 37 determines that the notification of charge state is necessary.

At time ti8 between time ti6 and time ti7, the line power 52 starts to decrease to be lower than the source electric power 51 because of increase in the charge amount 53. Then at time ti7, the source electric power 51 at plug receptacle 31 increases. However, the line power 52 does not increase correspondingly. At this time ti7, therefore, the condition (A) is satisfied but the condition (B) is not satisfied. The control unit 37 thus determines that the notification of the charge state is not necessary.

In the example of FIG. 19, the control unit 37 determines that the notification of charge state is necessary only at time ti6. Since the line power 52 decreases with the decrease in the source electric power 51 at time ti6, the charge end time te5 predicted at that time is delayed to be later than that predicted at the time of start of charging. Further, since the line power 52 does not change even if the source electric power 51 increases at time ti7, the charge end time predicted at that time does not change from the charge completion time te5 predicted at time ti6.

Figure 20:
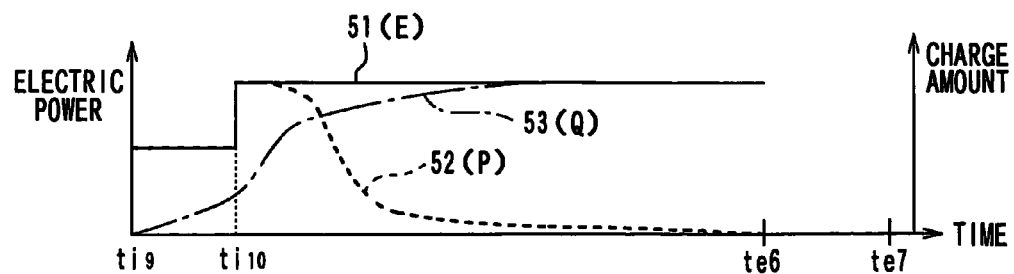
FIG. 20 is a schematic diagram showing an example of checking by the first and the second check methods whether the charge state notification is necessary.

FIG. 20 shows an example, in which the vehicle 1 is connected to the plug receptacle 31 at time ti9 to be charged while one vehicle is being connected to either one of the plug receptacles 32 and 33 and charged, and thereafter one vehicle connected to the plug receptacle 32 or 33 is disconnected at time ti10.

In this example, the source electric power 51 at the plug receptacle 31 increases and correspondingly the line power 52, which has been limited by the source electric power 51, also increases to the same power as the source electric power 51. At this time ti10, both conditions (A) and (B) are satisfied. Therefore, the control unit 37 determines that the notification of the charge state is necessary.

In the example of FIG. 20, since the line power 52 increases with the increase in the source electric power 51 at time ti10, the charge end time te6 predicted at that time becomes earlier than the charge end time te7 predicted at time ti9.

By performing the first determination method, the control unit 37 can transmit the signal including the charge state when the charge end time becomes later or earlier than that predicted at the time of start of charging.

[2] Second Determination Method (Decrease of Electric Source Power E and Corresponding Change of Line Power)

According to the second determination method, it is determined to be necessary to notify the mobile terminal 20, which corresponds to the battery 2 connected to the plug receptacle, 31, of the charge state of the battery 2, if both of the following conditions (C) and (B) are satisfied. The notification is determined to be unnecessary, if at least one of the conditions (C) and (B) is not satisfied.

(C) The electric source power E at the plug receptacle 31 has decreased by an amount equal to or greater than the threshold value ε.

This condition (C) is similar to the condition (A) except that the source electric power E has increased by the amount equal to or greater than the threshold value ε. Whether the condition (C) is satisfied is determined by checking whether the following inequality holds.

$$Ei-Ei-1<-\epsilon, \text{ in which } \epsilon \text{ is 0 or positive.}$$

According to the second determination method, the notification of the charge state is determined to be necessary in the similar manner as in the first determination method in the case of FIGS. 15 to 17 and 19. In the case of FIG. 18, however, the notification is performed only at time ti4, at which the source electric power 51 decreases, according to the second determination method, as opposed to the case, in which the notifications are performed at both times ti4 and ti5 according to the first determination method. In the example of FIG. 20, the notification is not determined to be necessary at any time according to the second determination method, although the notification is determined to be necessary at time ti10 according to the first determination method.

According to the second determination method, the control unit 37 transmits the signal including the charge state to the mobile terminal 20 when the predicted charge end time te will be delayed to be later than that predicted at the time of start of charging. However, it does not transmit such a signal when the predicted end time te will become earlier than that predicted at the time of start of charging. In many instances, the delay of the predicted charge end time is more influential in adverse on users. Therefore, according to the second determination method, the mobile terminal 20 can be notified of the charge state only when a particularly significant change has arisen.

[3] Third Determination Method (First Determination Method Plus a Change of More than a Predetermined Time in Predicted Charge End Time)

According to the third embodiment, it is determined to be necessary to notify the mobile terminal 20, which corresponds to the battery 20 connected to the plug receptacle 31, of the charge state when all of the conditions (A) and (B) used in the first determination method and the following condition (D) are satisfied. It is determined that the notification is not necessary, when at least one of the conditions (A), (B) and (C) is not satisfied.

(D) The predicted charge end time of charging the battery 2 from the plug receptacle 31 is increased or decreased by an amount equal to or more than a predetermined time. Whether the condition (D) is satisfied or not is determined by checking whether the following inequality holds.

$$|Tfi-Tf0|>Tx$$

Here, Tx is a threshold value, which the user of the charge device 30 may arbitrarily set (for example, a particular time between 15 minutes and 30 minutes). Tfi is the latest predicted charge completion end time calculated by the control unit 37 based on the latest electric source power Ei at the plug receptacle 31 and the latest charge amount of the battery 2 (received from the in-vehicle radio unit 11).

The control unit 37 pre-stores in its ROM or the like a charge curve information to calculate the predicted charge end time te. This charge curve information indicates a characteristic relation between the charge amount of the battery 2 and a maximum power (that is, maximum receivable power), which the battery 2 can receive at each charge amount. By using the charge curve information and the present latest charge amount Si, the line power P to the battery 2 and the charge amount of the battery 2 at each time after the present time can be estimated. This estimation is performed by assuming that the electric source power E at the plug receptacle 31 does not change from the present latest electric source power Ei.

Specifically, the maximum receivable power, which corresponds to the present latest charge amount, is calculated based on the charge curve information. Smaller one of the calculated maximum receivable power and the present latest electric source power Ei is used as the line power Pi at the present time ti. The charge amount after a short period ti+Δt is calculated based on the present line power Pi and the charge amount Si. The maximum receivable power, which corresponds to the calculated charge amount, is calculated by using the charge curve information. Smaller one of the calculated maximum receivable power and the present latest electric source power Ei is used as the line power Pi+1 at time ti+Δt. Based on the line power Pi+1 and the charge amount at time ti+Δt, a charge amount after a further short period ti+2Δt is calculated. By repeating the above calculation processing, the line power P and the charge amount of the battery 2 at each time after the present time can be estimated.

As the reference Tf0 for comparison, the latest predicted charge end time Tf1, at which the conditions (A), (B) and (D) are satisfied last, is substituted. That is, Tf0 is the predicted charge end time predicted at time, at which it is determined last that the predicted charge end time changes more than a predetermined time. The initial value of Tf0 is equal to the latest expected charge end time Tfi at the time of start of the battery 2.

That is, as the predicted charge end time reference Tf0 for comparison, the predicted charge end time predicted at the time of start of charging is substituted first. The predicted charge end time Tf0 does not change thereafter until it is determined that the predicted charge end time changes more than the predetermined time. When it is determined that the predicted charge end time changes more than the predetermined time, the latest predicted charge end time Tfi at that time is substituted.

The notification of the charge state is determined to be necessary at times shown in FIGS. 21A to 21C and FIGS. 22A to 22D, in the case of the third determination method.

In each of those figures, the solid line 51, the broken line 52 and the dot-and-chain line 53 indicate the time change in the source electric power E at the plug receptacle 31, the time change in the line power P supplied from the plug receptacle 31 to the battery 2 and the time change in the charge amount Q of the battery 2, respectively.

Figure 21A:
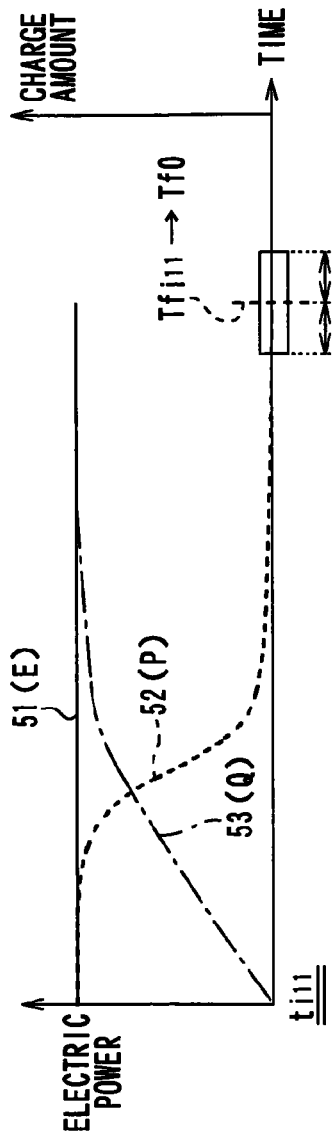
FIGS. 21A to 21C are schematic diagrams showing examples of checking by a third and a fourth check methods whether the charge state notification is necessary.

The lines 51 to 53 in FIG. 21A indicate the time changes estimated at charge start time ti11 to occur after the charge start time ti11. The lines 51 to 53 in FIG. 21B indicate results of the past time changes before time ti12 and time changes estimated at time ti12 to occur after time ti12. The lines 51 to 53 in FIG. 21C indicate results of the past time changes before time ti13 and time changes estimated at time ti13 to occur after time ti13. The lines 51 to 53 in FIG. 22A indicate time changes estimated at charge start time ti14 to occur after the charge start time ti14. The lines 51 to 53 in FIG. 22B indicate results of the past time changes before time ti15 and time changes estimated at time ti15 to occur after time ti15. The lines 51 to 53 in FIG. 22C indicate results of the past time changes before time ti16 and time changes estimated at time ti16 to occur after time ti16. The lines 51 to 53 in FIG. 22D indicate results of the past time changes before time ti17 and time changes estimated at time ti17 to occur after time ti17.

FIG. 21A shows time changes estimated at time ti11, at which the vehicle 1 is connected to the plug receptacle 31 and charging is started. It is assumed that no vehicles are connected to the plug receptacles 32 and 33 other than the plug receptacle 31 at this time ti11 and also after this time. The control unit 37 therefore estimates that the electric source power E will change as shown by the solid line 51. The line power 52 at each time is calculated based on the source electric power 51. The charge amount 53 at each time is calculated based on the calculated line power 52. The line power 52 is determined by calculating the maximum power, which the battery 2 can receive as charge each time, from the charge curve information of the battery 2 and then selecting the smaller one of the calculated maximum power and the electric source power E.

The control unit 37 calculates the time (that is, estimated charge end time) Tfi11, at which the battery 2 will be charged to its full capacity, based on the estimated change of the calculated charge amount 53. The latest estimated charge end time Tfi11 at the time of start of charging is substituted into the estimated charge end time reference Tf0 for comparison.

As long as the vehicle 1 is continuously connected to the plug receptacle 31 with no other vehicle being connected to the other plug receivers 32 and 33, the electric source power E at the plug receptacle 31 does not change. Therefore, the latest charge end time predicted each time becomes equal to the predicted charge end time Tfi11 calculated at time ti11. The charge end time reference Tf0 for comparison is not changed.

Figure 21B:
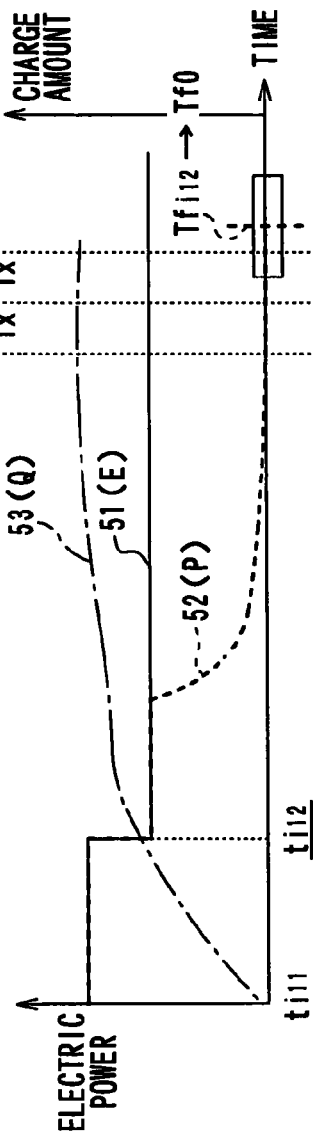

It is assumed next that, as shown in FIG. 21B, one vehicle is connected to either one of the other plug receivers 32 and 33 to be charged at time ti12 while the vehicle 1 is being connected to the plug receptacle 31 and charged by the line power P, which is the same as the electric source power E. The time ti12 is in an early stage of charging.

In this case, the electric source power E at the plug receptacle 31 decreases and the line power P also decreases by the same amount. Therefore the conditions (A) and (B) are satisfied. At this time, the control unit 37 calculates the latest predicted charge end time Tfi12 on an assumption that the source electric power E continues to remain at the decreased power level. As a result, the predicted charge end time Tfi12 will be delayed to be later than the predicted charge end time Tfi11 calculated at time ti11.

In case of FIG. 21B, the absolute value of the difference between the predicted charge end time reference Tf0 (=Tfi11) for comparison and the predicted charge end time Tfi12 becomes greater than the threshold time Tx. Therefore, the condition (D) is also satisfied. The control unit 37 thus determines that the notification of the charge state is necessary. The control unit 37 substitutes the predicted charge end time Tfi12 at this time into the predicted charge end time reference Tf0 for comparison.

It is assumed that, differently from the case of FIG. 21B, time elapses after time shown in FIG. 21A and one vehicle is connected to either one of the other plug receivers 32 and 33 to be charged at time ti13. This time ti13 is in an intermediate stage of charging, at which the line power P has decreased to be lower than the electric source power E.

In this case, the electric source power E at the plug receptacle 31 decreases and correspondingly the line power P also decreases to the same level as the electric source power E. As a result, both conditions (A) and (B) are satisfied. At this time, the control unit 37 calculates the latest charge end time Tfi13 on an assumption that the electric source power E continues to remain as decreased. As a result, the predicted charge end time Tfi13 is delayed to be later than the predicted charge end time Tfi11 calculated at time ti11.

Figure 21C:
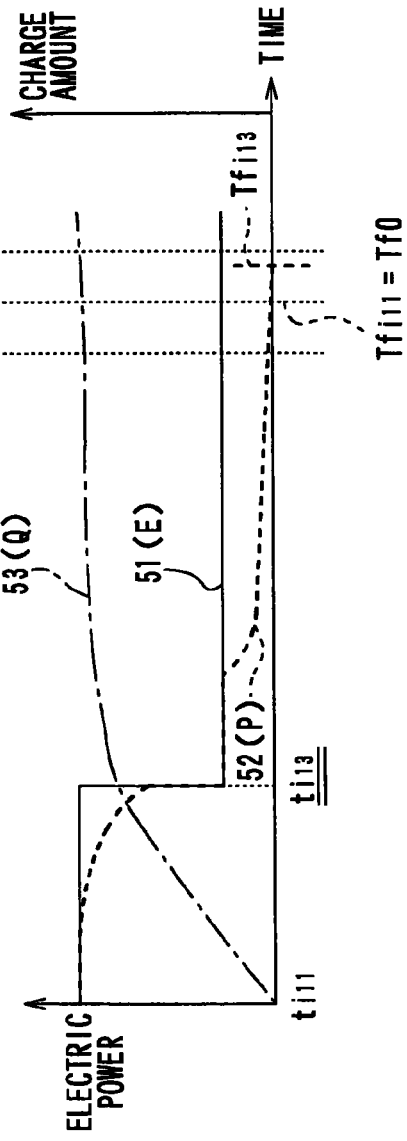

In the case of FIG. 21C, however, the absolute value of the difference between the predicted charge end time reference Tf0 (=Tfi11) and the predicted charge end time Tfi13 is smaller than the threshold time Tx. The condition (D) is thus not satisfied. The control unit 37 therefore determines that the notification of the charge state is not necessary. Therefore the control unit 37 does not substitute the predicted charge end time Tfi13 into the predicted charge end time reference Tf0 for comparison.

FIG. 22A shows changes predicted at time ti14 in case that the vehicle 1 is connected to the plug receptacle 31 and charged. At this time, one vehicle is connected to only one of the plug receptacles 32 and 33 other than the plug receptacle 31. The control unit 37 assumes that this connection between the vehicles and the plug receptacles 31 to 33 does not change at subsequent time after time ti14. The control unit 37 predicts that the electric source power E will change as shown by the solid line 51. The control unit 37 calculates the line power 52 of each time based on the source electric power 51. The control unit 37 calculates the charge amount 53 of each time based on the calculated line power 52. The control unit 37 calculates the predicted charge end time Tfi14 based on the calculated predicted change of the charge amount 53. This latest predicted charge end time Tfi14 calculated at the time of start of charging is substituted into the predicted charge end time reference Tf0.

As long as the vehicle 1 is connected to the plug receptacle 31 and one other vehicle is connected to either one of the plug receptacles 32 and 33, the electric source power E at the plug receptacle 31 does not change. As a result, the latest predicted charge end time calculated each time becomes the same as that calculated at time ti14. Therefore, no new value is substituted into the predicted charge end time reference Tf0.

It is further assumed that, as shown in FIG. 22B, charging of the vehicle connected to the plug receptacle 32 or 33 is completed and the vehicle is disconnected from the plug receptacle 32 or 33 at time ti15, which is in an intermediate stage of charging. At this time ti15, the vehicle 1 is connected to the plug receptacle 31 and charged with the same line power P as the electric source power E.

In this case, the electric source power E at the plug receptacle 31 increases and the line power P correspondingly increases by the same amount. Thus, the conditions (A) and (B) are satisfied. At this time, the latest predicted charge end time Tfi15 is calculated by the control unit 37 on an assumption that the increased electric source power E continues. As a result, the predicted charge end time Tfi15 becomes earlier than that Tfi14 predicted at time ti14.

In the case of FIG. 22B, the absolute value of the difference between the predicted charge end time reference Tf0 and the predicted charge end time Tfi15 becomes greater than the threshold value Tx. Thus, the condition (D) is also satisfied. The control unit 37 therefore determines that the notification of the charge state is necessary. The control unit 37 substitutes the predicted charge end time Tfi15 at this time into the predicted charge end time reference Tf0.

It is assumed next that, as shown in FIG. 22C, one vehicle is newly connected to only one of the plug receptacles 32 and 33 and charged at time ti16 under a condition that the vehicle 1 is connected to the plug receptacle 31 and charged with the line power P, which is the same as the electric source power E. The time ti16 is in an early stage of charging of the vehicle 1.

In this case, the electric source power E at the plug receptacle 31 decreases and the line power P also decreases correspondingly by the same amount. Therefore, the conditions (A) and (B) are satisfied. At this time, the control unit 37 calculates the latest predicted charge end time Tfi16 on an assumption that the decreased electric source power E continues. As a result, the predicted charge end time Tfi16 becomes later than that Tfi15 calculated at time Ti15.

In the case of FIG. 22C, however, the absolute value of the difference between the predicted charge end time reference Tf0 (=Tfi15) and the predicted charge end time Tfi16 is smaller than the threshold time Tx. Thus the condition (D) is not satisfied. The control unit 37 therefore determines that the notification of the charge state is not necessary. The control unit 37 does not substitute the predicted charge end time Tfi16 at this time into the predicted charge end time reference Tf0.

It is further assumed that, as shown in FIG. 22D, one more vehicle is newly connected to the other one of the plug receptacles 32 and 33 and charged at time ti17 under a condition that the vehicle 1 and one vehicle are connected to the plug receptacle 31 and the receiver 32 or 33 and charged with the line power P, which is lowered from the source electric power 51. At this time, all the plug receptacles 31 to 33 are connected to the vehicles to charge the batteries of the respective vehicles 1, 41 and 42. At this time ti17, the condition (A) is satisfied but the condition (B) is not satisfied. The control unit 37 therefore does not determine that the notification of the charge state is necessary.

(4) Fourth Determination Method (Second Determination Method Plus Change in Predicted Charge End Time by an Amount Greater than Predetermined Time)

According to the fourth determination method, it is determined to be necessary to notify the mobile terminal 20, which corresponds to the battery 2 connected to the plug receptacle 31, of the charge state of the battery 2 if the conditions (B), (C) and (D) are satisfied. The notification is determined to be unnecessary, if at least one of the conditions (B), (C) and (D) is not satisfied.

According to the second determination method, the notification of the charge state is determined to be necessary in the similar manner as in the third determination method in the case of FIG. 21. In the case of FIG. 22, the notification is determined to be necessary at time ti15 according to the third determination method. However, according to the fourth determination method, the notification is not performed because the condition (C) is not satisfied.

According to the fourth determination method, the control unit 37 transmits the signal including the charge state to the mobile terminal 20 when the charge end time will be delayed more than the predetermined time Tx from that predicted at the time of start of charging. However, it does not transmit such a signal when the predicted end time will become earlier than that predicted at the time of start of charging. In many instances, the delay of the charge end time is more influential in adverse on the user of the vehicle than advance. Therefore, according to the fourth determination method, the mobile terminal 20 can be notified of the charge state only when a particularly significant change has arisen.

[5] Fifth Determination Method (Determination According to Charge Schedule)

According to the fifth determination, the predicted charge end time is calculated in a different method in the first to the fourth determination methods without changing the conditions. Specifically, in the first to the fourth determination methods, the predicted charge end time is calculated on an assumption that the electric source power E at the plug receptacle 31 will not change after the present time. According to the fifth determination method, however, the electric source power E is calculated to change with respect to time after the present time based on the charge schedule.

Here, the charge schedule means prediction information about how many vehicles will be connected to the charge device 30 and charged at each time in the future. For example, in a case that a specified vehicle will be charged from time X to time Y by reservation, a charge operator generates a charge schedule, which reflects such a reservation, and inputs the data of the charge schedule in the charge device 30. The control unit 37 thus stores the charge schedule in the RAM.

Figure 23A:
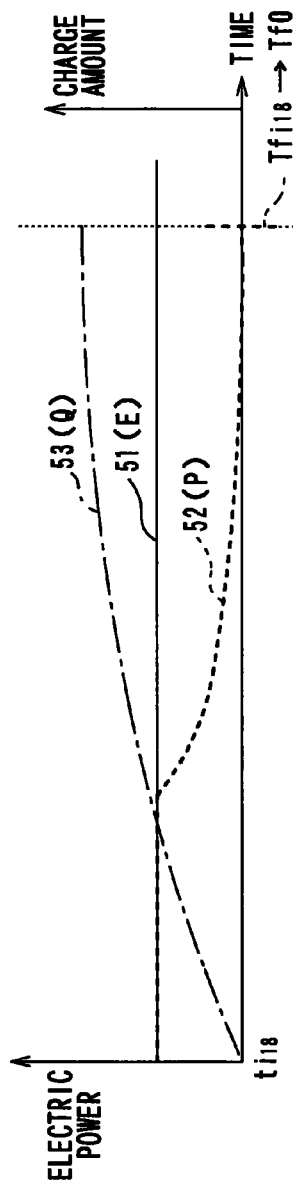
FIGS. 23A and 23B are schematic diagrams showing examples of checking by a fifth check method whether the charge state notification is necessary.
Figure 23B:
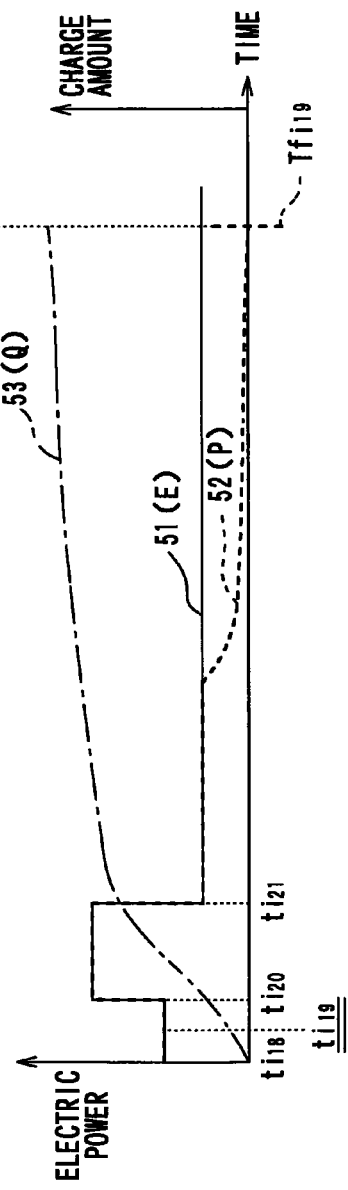

FIGS. 23A and 23B are examples of determinations whether the notification of the charge state is necessary, in case that the predicted charge end time is calculated by using the charge schedule.

FIG. 23A shows changes predicted at time ti18, at which the vehicle 1 is connected to the plug receptacle 31 and charged. At this time, it is only the plug receptacle 32 that is connected to a vehicle other than the plug receptacle 31. In the charge schedule of the charge device 30, no other vehicles are scheduled to be charged by the charge device 30. Further, the vehicle presently connected to the charge device 30 is not scheduled to end the charging. The control unit 37 therefore assumes that the plug receptacles 31 to 33 will remain in the same state after time ti18 and predicts that the electric source power E will remain the same as indicated by the line 51. The control unit 37 calculates the predicted charge end time Tfi14 based on the source electric power 51. The control unit 37 substitutes the latest predicted charge end time Tfi18 at the time of the start of charging for the predicted charge end time reference Tf0 for comparison.

It is assumed that, as shown in FIG. 23B, a charge operator inputs a new charge schedule into the charge device 30 at time ti19 with all the plug receptacles 31 to 33 remaining in the same state. The inputted and updated charge schedule is assumed to indicate that the vehicle connected to the plug receptacle 32 ends the charging and is disconnected from the plug receptacle 32 at time ti20 and that other two vehicles are connected to the plug receptacles 32 and 33 to be charged at time ti21.

In this case, the control unit 37 calculates a new predicted charge end time Tfi19 based on the updated charge schedule and substitutes it into the predicted charge end time reference Tf0 for comparison. If the absolute value of the difference between the predicted charge end time Tfi19 and the previous predicted charge end time reference Tf0 is greater than the threshold time Tx, it may be determined that the notification is necessary.

If the vehicle is disconnected from the plug receptacle 32 at time ti20 as scheduled, the source electric power 51 increases and correspondingly the line power 52 also increases to the same level. Thus, the conditions (A) and (B) are satisfied. However, since the predicted charge end time reference Tf0 is calculated by taking this change in the source electric power 51, the latest predicted charge end time Ti20 becomes the same as the predicted charge end time Tf0. Therefore, the condition (D) is not satisfied. The control unit 37 determines that the notification is not necessary.

When the new vehicles are connected to the plug receptacles 32 and 33 and charged, the source electric power 51 decreases and correspondingly the line power 52 also decreases to the same level. Thus, the conditions (A), (B) and (C) are satisfied. However, the predicted charge end time reference Tf0 is calculated in consideration of this change in the source electric power 51, the latest predicted charge end time Ti21 becomes equal to the predicted charge end time reference Tf0. As a result, since the condition (D) is not satisfied, the control unit 37 determines that the notification is not necessary.

Thus, according to this determination method, expected changes in the source electric power 51 at one or a plurality of times Ti20 and Ti21 are acquired as the charge schedule, the predicted charge end time is calculated based on the acquired charge schedule, and the charge state is notified to the mobile terminal 20. Thus, the charge state need not be notified to the mobile terminal 20 at each of the plurality of times Ti20 and Ti21, thereby reducing communications cost.

As described above, in the charge state notification system according to the present embodiment, the control unit 37 determines that the charge state need be notified to the mobile terminal 20 based on the change in the electric source power E at the plug receptacle 31.

If the electric source power E at the plug receptacle 31 changes, it is likely that the change in the charge amount of the battery 2 will change very differently from that predicted before the change in the electric source power E. Therefore, by notifying the mobile terminal 20 of the charge state after this change, the mobile terminal 20 can calculate the estimate charge amount more accurately based on the received charge state.

More specifically, the control unit 37 determines that the notification of the charge state is necessary based on that the electric source power E at the plug receptacle 31 has changed and the line power P supplied actually from the plug receptacle 31 to the battery 2 has become the same.

In some cases, the line power P does not change even if the electric source power E at the plug receptacle 31 changes. For example, this occurs when the line power P has already decreased greatly from the electric source power E at the time of change of the electric source power E (for example, FIG. 17). By setting the additional condition that the line power P and the electric source power E are equal to each other as described above, it is prevented that the mobile terminal 20 will receive a notification of charge state, which is not so necessary.

Further, the control unit 37 determines that the notification of the charge state to the mobile terminal 20 is necessary based on that the electric source power E and the plug receptacle 31 has changed, the line power P actually supplied from the plug receptacle 31 to the battery 2 has become equal to the electric source power E and the predicted charge end time Tfi of the battery 2 has changed more than the predetermined time from the predicted charge end time Tf0, at which the notification of the charge state to the mobile terminal 20 was performed last time.

In some cases, the predicted charge end time does not change so much from the predicted charge end time calculated at the time of last notification of the charge state, even if the electric source power E at the plug receptacle 31 changes and the line power P changes to the same level as the electric source power E. By stopping the notification in such cases, it is prevented that the mobile terminal 20 will receive a notification of charge state, which is not so necessary.

According to the present embodiment, the control unit 37 operates as one example of a check section by executing step 910 in FIG. 13 and as one example of a transmission section by executing step 915.

(Other Embodiments)

The present invention is not limited to the foregoing embodiments but may be implemented in other ways.

For example, the charge state transmitted at step 915 in FIG. 13 from the charge device 30 to the mobile terminal 20 is not limited to information about the charge amount of the battery 2 and the electric source power E, which can be supplied from the plug receptacle 31 of the charge device 30 to the vehicle 1. For example, the charge amount of the battery 2 may include the predicted amount of the charge amount of the battery 2 calculated at each time after the present time. In this instance, the mobile control unit 27 receiving the predicted charge amount of the battery 2 at each time after the present time may calculate the present estimate charge amount of the battery 2 by using this predicted value and display the amount related to the calculated estimate charge amount (for example, present estimate charge amount itself).

In the second embodiment, the control unit 37 of the charge device 30 need not perform the notification processing shown in FIG. 13. Alternatively, the in-vehicle control unit 14 in the in-vehicle door control apparatus 10 may perform this notification processing. In this instance, the in-vehicle control unit 14 may receive the information necessary for the notification processing from the control unit 37 by radio communications. The in-vehicle control unit 14 operates as one example of the charge state monitor apparatus.

In the second embodiment, the control unit 37 of the charge device 30 need not check whether the notification of the charge state is necessary nor notify the mobile terminal 20 of the charge state when necessary. That is, the charge device 30 need not positively transmit the charge state by push delivery. Instead, the pseudo push delivery may be performed for example. That is, the mobile control unit 27 of the mobile terminal 20 may regularly (for example, every several seconds) transmit an inquiry signal to the charge device 30 and the control unit 37 of the charge device 30 may notify the mobile terminal 20 of the charge state in response to this inquiry signal. In case of the pseudo inquiry signal, the predicted charge end time does not necessarily occur at the moment when the mobile terminal 20 transmits the inquiry signal to the charge device 30. Therefore, the information available when the change has occurred in the past may be transmitted to the mobile terminal 20.

Further, the vehicle door control system need not be the keyless entry system in the foregoing embodiments.

The vehicle door control system may be a system (improved keyless entry system), which is a smart entry system, an intelligent key system or the like other than the disclosed keyless entry system.

In case of the improved keyless entry system, a door manipulation unit for locking and unlocking a door is provided on the vehicle 1. Specifically, it may be attached to a part, which can be touched from the outside of the vehicle 1, such as a door knob. More specifically, a door lock switch (for example, a push button or a touch sensor) for manipulating the door lock operation may be provided on an outside of the door knob of the vehicle facing the outside of the vehicle 1 and a door unlock switch (for example, a push button or a touch sensor) for manipulating the door unlock operation may be provided on an inside of the door knob facing the vehicle 1. In this case, the manipulation on the door lock switch corresponds to the door lock manipulation and the manipulation on the door unlock switch corresponds to the door unlock manipulation.

In this improved keyless entry system, the in-vehicle control unit 14 controls the in-vehicle radio unit 11 to transmit a key request signal to the mobile terminal 20, when the door lock switch is manipulated. The mobile control unit 27 controls the mobile radio unit 21 to transmit a key signal of a predetermined contents to the in-vehicle door control apparatus 10, when the mobile radio unit 21 receives the key request signal. The in-vehicle control unit 14 determines that the door of the vehicle 1 should be locked, when the in-vehicle radio unit 11 receives the key signal at step 110 in FIG. 2. That is, the in-vehicle control unit 14 determines that the door of the vehicle 1 should be locked based on that the in-vehicle radio unit 11 has received the key signal and the door lock manipulation has been made on the door manipulation unit of the vehicle 1. The key signal corresponds to one example of the door lock signal.

In the improved keyless entry system, the in-vehicle control unit 14 controls the in-vehicle radio unit 11 to transmit the key request signal to the mobile terminal 20 based on that the door unlock switch has been manipulated. The mobile control unit 27 controls the mobile radio unit 21 to transmit the key signal to the in-vehicle door control apparatus 10 based on that the mobile radio unit 21 has received the key request signal. The in-vehicle control unit 14 determines that the door of the vehicle 1 should be unlocked based on the determination at step 610 in FIG. 8 that the in-vehicle radio unit 11 has received the key signal. That is, the in-vehicle control unit 14 determines that the door of the vehicle 1 should be unlocked based on that the in-vehicle radio unit 11 has received the key signal and the door unlock manipulation has been made on the door manipulation unit of the vehicle 1. The key signal corresponds to one example of the door unlock signal.

In the keyless entry system and the improved keyless entry system, although the door unlock manipulation and the door lock manipulation are different from each other, the door unlock manipulation and the door lock manipulation may be performed on the same button or switch provided on the door manipulation unit. That is, the door lock manipulation and the door unlock manipulation may be the same (common manipulation).

In this case, the mobile control unit 27 may store in its RAM or flash memory a lock flag, which indicates whether the door of the vehicle 1 is in the locked state or unlocked state. At step 305 in FIG. 4, it may be determined that the door lock manipulation has been performed, only when the common manipulation has been performed on the manipulation unit 23 under the condition that the lock flag indicates the unlocked state. Further, at step 710 in FIG. 9, it may be determined that the door unlock manipulation has been performed, only when the common manipulation has been performed on the manipulation unit 23 under the condition that the lock flag indicates the locked state.

The mobile control unit 27 may change the value of the lock flag to match with the actual door lock/unlock state based on the information transmitted from the in-vehicle door control apparatus 10. That is, the in-vehicle control unit 14 may, at step 130 in FIG. 2, lock the door and control the in-vehicle radio unit 11 to transmit the lock state signal indicating that the door is locked to the mobile terminal 20. The mobile control unit 27 may, at step 320 in FIG. 4, wait for the lock state signal in addition to the signal indicating the SOC and change the lock flag to a value indicating that the door is locked at the time of reception of the lock state signal. That is, the in-vehicle control unit 14 may, at step 640 in FIG. 8, unlock the door and control the in-vehicle radio unit 11 to transmit the lock state signal indicating that the door is unlocked to the mobile terminal 20. The mobile control unit 27 may, at step 740 in FIG. 9, wait for the lock state signal in addition to the plug state signal and change the lock flag to a value indicating that the door is unlocked at the time of reception of the lock state signal.

In case that the door unlock manipulation and the door lock manipulation are the same manipulation on the same button or the same switch, the door lock signal and the door unlock signal may be the same contents signal (common signal).

In this case, as shown by step 110 in FIG. 2, the in-vehicle control unit 14 determines that the door of the vehicle 1 should be locked based on that the common signal is received under the condition that the door is in the unlocked state. Thus, the common signal functions as the door lock signal under the condition that the door is in the unlocked state. Further, as shown by step 610 in FIG. 8, the in-vehicle control unit 14 determines that the door of the vehicle 1 should be unlocked based on that the common signal is received under the condition that the door is in the locked state. Thus, the common signal functions as the door unlock signal under the condition that the door is in the locked state.

The mobile terminal 20 may have a function of a cell phone.

At the time of transmission and reception of the door unlock signal, the plug state signal, the SOC signal and the charge state signal, a receiver side may return an acknowledgement (ACK) signal to a transmitter side for receiving such signals.

In the foregoing embodiments, the example of the amount, which is related to the estimate charge amount (estimated total charge amount Q2), is not limited to the estimated total charge amount Q2. However, it may be other amounts, which can be calculated by using the estimate charge amount (estimated total charge amount Q2). For example, the estimate charge amount (estimated total charge amount Q2) itself is one example of the amount related to the estimate charge amount (estimated total charge amount Q2).

The plug state detection unit 4 may detect whether the connector 6 of the vehicle 1 and the charge device 30 are connected through the power supply wire 8 by way of other methods, which are different from that disclosed in the foregoing embodiments. For example, the plug state detection unit 4 may detect connection and disconnection by communicating with the charge device 30 and receiving, from the charge device 30, information indicating whether the plug of the cable 7 has been plugged into the plug receptacle 31. The communications between the plug state detection unit 4 and the charge device 30 may be communications by way of a serial communications line, a radio communications such as LAN, or PLC (power-line carrier communications) using the power supply wire 8.

Figure 24:
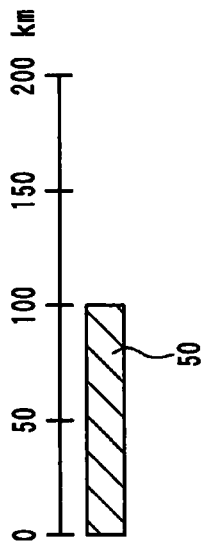
FIG. 24 is a diagrammatic view showing an example of indication on a display unit of the mobile terminal 20.

At step 550 in FIG. 6, the predicted travel distance L need not be displayed in numeric values as shown in FIG. 7. For example, as shown in FIG. 24, the predicted travel distance L may be displayed on the display unit 24*a* in a bar graph 50, which extends in the lateral direction in proportion to the distance L. The predicted travel distance L is not always accurate. Therefore, it may be more appropriate to display it generally in the form of bar graph 50 or the like than displaying numerically.

In the foregoing embodiments, the cable 7 need not be provided in the vehicle 1 to be connected to the charge device 30 at the time of charging. For example, the cable 70 may be provided at the charge device 30 to be connected to the connector of the vehicle 1 at the time of charging.

In the foregoing embodiments, the functions realized by the in-vehicle control unit 14 and the mobile control unit 27, which execute the programs may be realized by hardware (for example, FPGA capable of programming circuit configuration).

What is claimed is:

1. A vehicle door control system comprising:
   a door control apparatus mounted on a vehicle having a secondary battery, which stores electric energy as drive power and is chargeable by an external electric power source provided outside the vehicle;
   a mobile terminal configured to communicate with the door control apparatus; and
   a door manipulation unit provided on the mobile terminal or the vehicle to accept door lock manipulation by a user,
   the mobile terminal including a mobile radio unit, a mobile notification unit and a mobile control unit,
   the mobile radio unit being configured to perform radio communications with the door control apparatus, the mobile notification unit being configured to provide notification, and the mobile control unit being configured to control the mobile radio unit and the mobile notification unit,
   the door control apparatus including an in-vehicle radio unit and an in-vehicle control unit, the in-vehicle radio unit being configured to perform radio communications with the mobile unit, and the in-vehicle control unit being configured to control the in-vehicle radio unit,
   the mobile control unit being configured to control the mobile radio unit to transmit a predetermined door lock signal to the vehicle door control apparatus,
   the in-vehicle control unit including a door lock determination section and a transmission control section, the door lock determination section determining that the door need be locked when the door manipulation unit accepts the door lock manipulation and the in-vehicle radio unit receives the door lock signal, and the transmission control section locking the door when the door lock determination section determines that the door need be locked and controlling the in-vehicle radio unit to transmit a signal indicating a charge amount of the secondary battery at a time of a door lock time,
   the mobile control unit being configured to calculate an estimate charge amount of the secondary battery at a predetermined time after the mobile radio unit receives the signal indicating the charge amount, by adding an addition amount to the charge amount indicated by the received signal, wherein the addition amount corresponds to an elapse of time from the door lock time to a display time, and
   the mobile control unit being further configured to control the mobile notification unit to display an amount related to the calculated estimate charge amount.

2. The vehicle door control system according to claim 1, wherein:
   the in-vehicle control unit is configured to control the in-vehicle radio unit to transmit a plug state signal to the mobile terminal when the secondary battery is connected to the external electric power source through a power supply wire at the door lock time, the plug state signal indicating that the secondary battery is being connected to the external electric power source through the power supply wire; and the mobile control unit is configured to control the mobile notification unit to display information indicating that the secondary battery is connected to the external electric power source, when the mobile radio unit receives the plug state signal.

3. The vehicle door control system according to claim 1, wherein:
the in-vehicle control unit is configured to control the in-vehicle radio unit to transmit a charge state signal to the mobile terminal when the secondary battery is charged by the external electric power source at the door lock time, the charge state signal indicating that the secondary battery is being charged by the external electric power source; and
the mobile control unit is configured to control the mobile notification unit to display information indicating that the secondary battery is being charged by the external electric power source, when the mobile radio unit receives the charge state signal.

4. The vehicle door control system according to claim 1, wherein:
the mobile control unit is configured to calculate a predicted travel distance, which the vehicle can travel with the estimate charge amount of the secondary battery calculated at the display time without being charged further by external power sources, and to control the mobile notification unit to display the predicted travel distance as the amount related to the estimate charge amount.

5. The vehicle door control system according to claim 4, wherein:
the mobile control unit is configured to calculate the predicted travel distance by dividing the estimate charge amount by an electric power consumption rate, which the vehicle consumes to travel a unit travel distance, the electric power consumption rate being determined based on an amount of decrease in the charge amount of the secondary battery per unit travel distance in a past travel of the vehicle.

6. The vehicle door control system according to claim 4, wherein:
the mobile terminal includes a numeric value input unit, by which the user inputs numeric values; and
the mobile control unit is configured to calculate the predicted travel distance by dividing the estimate charge amount by an electric power consumption rate, which the vehicle consumes to travel a unit travel distance, the electric power consumption rate being determined based on the numeric value inputted by the user to the numeric value input unit.

7. The vehicle door control system according to claim 1, wherein:
the transmission control unit of the in-vehicle control unit controls the in-vehicle radio unit to transmit the signal indicating the charge amount of the secondary battery to the mobile terminal immediately as a signal, which the in-vehicle radio unit transmits first after the door lock determination section detects reception of the door lock signal.

8. The vehicle door control system according to claim 1, wherein:
the door manipulation unit is provided on the mobile terminal;
the mobile control unit is configured to control the mobile radio unit to transmit the door lock signal to the vehicle door control apparatus when the door manipulation unit accepts the door lock manipulation; and
the door lock determination section determines that the door need be locked, when the in-vehicle radio unit receives the door lock signal transmitted in response to the door lock manipulation.

9. The vehicle door control system according to claim 1, wherein:
the door manipulation unit is provided on the vehicle; and
the door lock determination section determines that the door need be locked, when the in-vehicle radio unit receives the door lock signal and the door manipulation unit accepts the door lock manipulation.

* * * * *